United States Patent [19]

Taniguchi et al.

[11] Patent Number: 4,816,862
[45] Date of Patent: * Mar. 28, 1989

[54] POWER SUPPLY SYSTEM FOR MEMORY UNIT OF CAMERA

[75] Inventors: Noguyuki Taniguchi, Tondabayashi; Shinji Tominaga, Osaka; Kouji Yamamoto; Hiroshi Ootsuka, both of Sakai; Hiroshi Ueda, Nara, all of Japan

[73] Assignee: Minolta Camera Kabushiki Kaisha, Osaka, Japan

[*] Notice: The portion of the term of this patent subsequent to May 5, 2004 has been disclaimed.

[21] Appl. No.: 46,940

[22] Filed: May 5, 1987

Related U.S. Application Data

[63] Continuation-in-part of Ser. No. 813,150, Dec. 24, 1985, Pat. No. 4,662,736.

[30] Foreign Application Priority Data

| Dec. 29, 1984 | [JP] | Japan | 59-201225 |
| Apr. 3, 1985 | [JP] | Japan | 60-49740 |
| Jul. 23, 1985 | [JP] | Japan | 60-113427 |
| Jul. 23, 1985 | [JP] | Japan | 60-113428 |
| Jul. 23, 1985 | [JP] | Japan | 60-113429 |
| Aug. 2, 1985 | [JP] | Japan | 60-119657 |
| Aug. 2, 1985 | [JP] | Japan | 60-119658 |
| Aug. 6, 1985 | [JP] | Japan | 60-121187 |

[51] Int. Cl.$^4$ ............... G03B 7/26; G03B 17/24; G11C 29/00; H02J 9/00
[52] U.S. Cl. .................... 354/412; 354/468; 354/484; 365/229; 307/23; 307/28; 307/29; 307/39; 307/66; 307/86
[58] Field of Search ........ 354/412, 465, 468, 471–475, 354/484, 289.1, 289.12; 365/226–229; 307/23, 28, 29, 38, 39, 51, 64, 66, 75, 86; 340/636, 660, 661, 663; 364/200 MS File, 900 MS File

[56] References Cited

U.S. PATENT DOCUMENTS

| 4,044,268 | 8/1977 | Hammel et al. | 307/66 |
| 4,091,395 | 5/1978 | Kozuki et al. | 307/66 X |
| 4,182,110 | 1/1980 | Kamiwaki et al. | 307/64 X |
| 4,209,710 | 6/1980 | Quarton | 307/66 |
| 4,422,163 | 12/1983 | Oldenkamp | 365/229 |
| 4,469,990 | 9/1984 | Maruyama et al. | 315/241 P |
| 4,506,766 | 3/1985 | Watanabe | 307/64 X |
| 4,509,843 | 4/1985 | Hasegawa | 354/412 |
| 4,561,754 | 12/1985 | Matsuyama | 354/484 |
| 4,580,248 | 4/1986 | Imaizumi | 356/229 |
| 4,587,640 | 5/1986 | Saitoh | 365/229 |
| 4,662,736 | 5/1987 | Taniguchi et al. | 354/412 |
| 4,672,585 | 6/1987 | Nollet | 365/226 X |

FOREIGN PATENT DOCUMENTS

| 42524 | 3/1984 | Japan | 354/484 |
| 91525 | 5/1984 | Japan | 365/229 |
| 191026 | 10/1984 | Japan | 354/105 |
| 31669 | 4/1985 | Japan. | |
| 31670 | 4/1985 | Japan. | |

Primary Examiner—W. B. Perkey
Attorney, Agent, or Firm—Burns, Doane, Swecker & Mathis

[57] ABSTRACT

An electronic appliance having a microcomputer, peripheral devices controlled by the microcomputer, a main battery acting as power source, and a backup battery for outputting signals indicating the presence and absence of the main battery. Checking is made of whether the main battery is loaded in the appliance or not and whether the output voltage of the main battery is above a predetermined voltage or not. When the main battery is not loaded or when its output voltage is below the predetermined voltage, the backup battery is made available for preserving information in the memory inside or outside the microcomputer in good order, with operations of the peripheral devices being restricted at such times. Further, the disclosed electronic appliance provides for limiting malfunctioning of the microcomputer and the peripheral devices when a new main battery has been loaded in the appliance as replacement for an exhausted main battery.

8 Claims, 16 Drawing Sheets

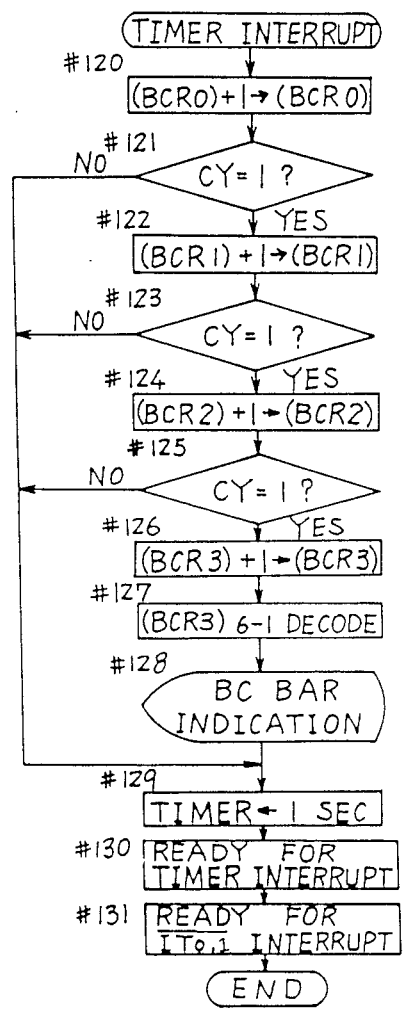

Fig. 10
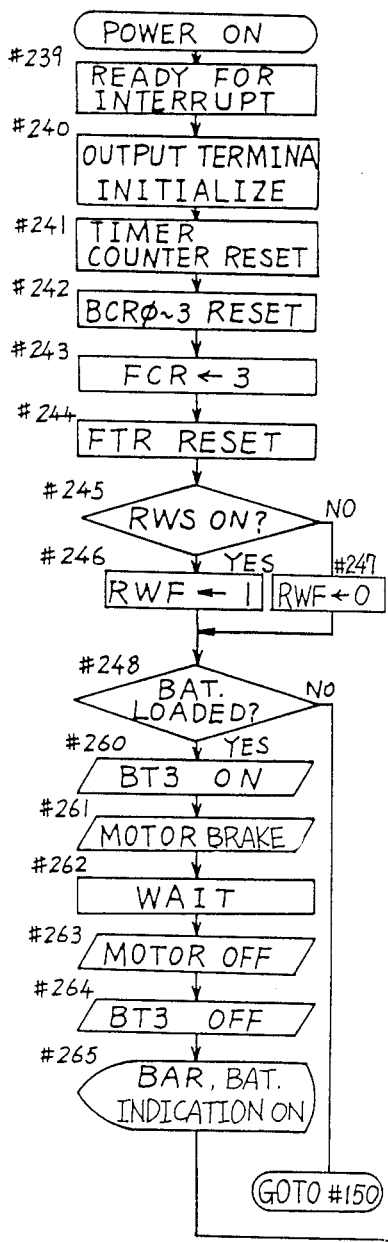
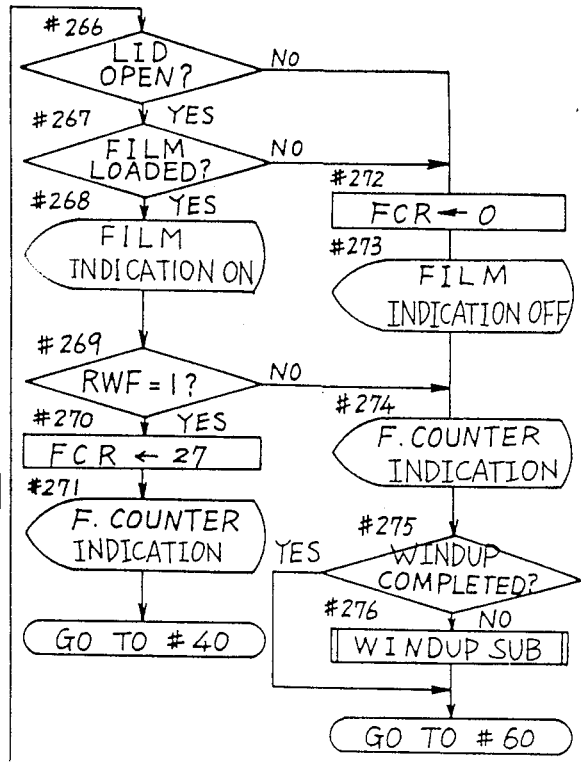

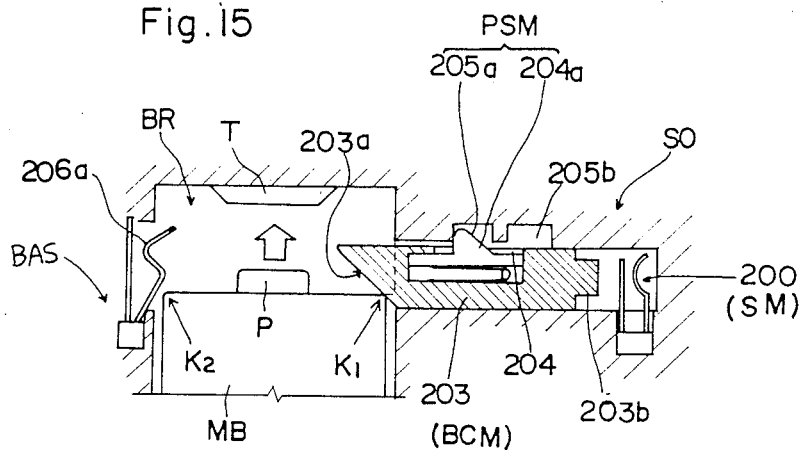
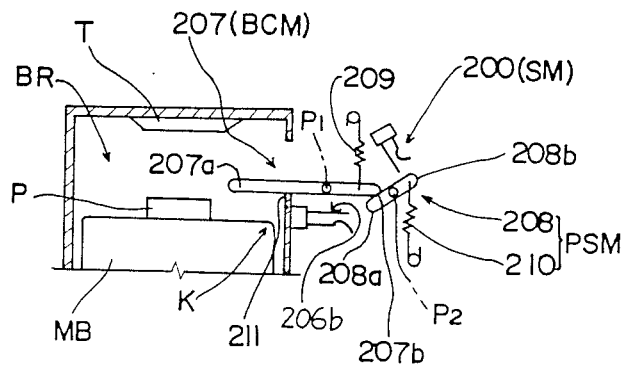
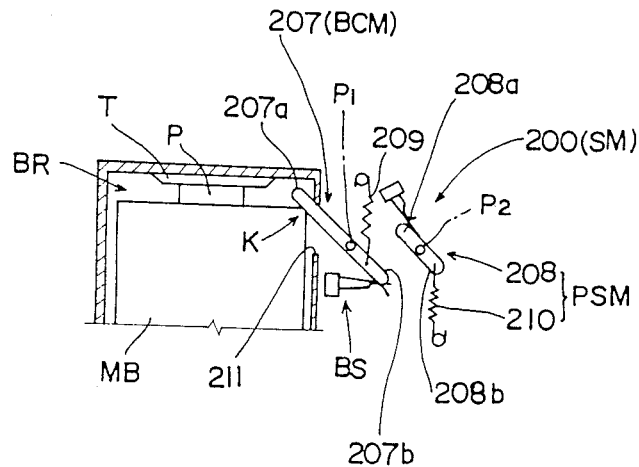

POWER SUPPLY SYSTEM FOR MEMORY UNIT OF CAMERA

This is a continuation-in-part of Application Ser. No. 813,150, filed Dec. 24, 1985, now U.S. Pat. No. 4,662,736.

BACKGROUND OF THE INVENTION

1. Field of the Invention

The present invention relates to an electronic instrument such as a camera receiving electric power from a main battery and a backup device, and more particularly to an electronic instrument which includes electronically operating devices such as a microcomputer, a memory device or the like.

2. Description of the Prior Art

In recent years an increasing number of electronic instruments are provided with a microcomputer in order to control various devices thereof with high precision. With such an electronic instrument, varied control data are stored in the memory of the microcomputer. It is common practice to use a battery as an electric power source for supplying power to the microcomputer in a camera or other portable instrument, and the battery must be replaced when its capacity is exhausted through use. When the battery is taken out of the camera for replacement, data stored in the memory which normally are of the volatile nature will be cancelled and disappear. Thus, some backup means such as a backup battery is provided to supply power to the microcomputer when the battery normally acting as the power source, or a main battery, is replaced.

However, if the capacity of the backup battery has been exhausted by the time the main battery is taken out for replacement and power should be supplied to the microcomputer by the backup batter, the output voltage of the backup battery does not reach a normal operating voltage of the microcomputer and does not guarantee proper maintenance of the data stored in the memory. When in such a case a new main battery is loaded into the camera and the microcomputer resumes its operation, the ill-maintained information in the memory will be used which results in malfunctioning of the varied devices acting under control of the microcomputer.

Furthermore, consumption of the backup battery will progress to an undesirable extent when a new main battery is not loaded for a long time or its loading is forgotten after an old main battery is taken out for replacement. And when the voltage of the backup battery drops below a critical voltage for memory operation, the contents of the memory such as a random access memory (RAM) will be erased. Where the electronic instrument includes an indicating device for indicating the results of calculations or control states of the microcomputer, the indicating device may be in operation although the data in the RAM have been erased. This is because the RAM has a much narrower range of operating voltage than the indicating device, and will mislead the user to believe from the indications of the indicating device that the electronic instrument is in condition for proper operation. When the electronic instrument is operated in that state, inconveniences such as its malfunctioning or breakdown will be encountered.

In another known arrangement such as disclosed in Japanese utility model applications laid open for public inspection under Nos. 60-31669 and 60-31670, the microcomputer is reset when a main battery is loaded and when the capacity of the backup battery reduces below a predetermined value. With the above arrangement, the microcomputer is reset when a new main battery is loaded, and all the data will be erased from the memory even if properly preserved by the backup battery having a sufficient capacity. In the case of camera, for example, it is then necessary to set film sensitivity, the number of exposed frames of film and other data all over again.

Moreover, even if the main battery alone is sufficient to supply power to the microcomputer, the microcomputer is reset when the capacity of the backup battery drops below the predetermined value. Therefore all the devices controlled by the microcomputer will stop operating.

In the case of an electronic instrument wherein at least a small-load circuit such as the memory receives power supply from the backup battery only when the output voltage of the main battery has reduced or when the main battery is replaced with a new one, generally the backup battery is already mounted in the instrument but the main battery is not loaded at the time of shipment from a factory. The main battery is loaded by the user for starting operation of the devices in the instrument or camera. With this type of instrument, the power supply from the backup battery to the memory is allowed in an initial state, namely from the time of shipment from the factory without the main battery being loaded in the instrument.

In other words, the memory receives constant power supply from the backup battery until the user purchases the instrument and loads it with a main battery for the first time. Generally, power consumed by the memory is very small compared with power consumed by a great-load circuit which receives power supply from the main batter, but the capacity of the backup battery will be reduced with lapse of a long time after the shipment from the factory.

SUMMARY OF THE INVENTION

The object of the present invention is to provide an electronic instrument receiving an electric power from a main battery and a backup device, which instrument is operable properly when the output voltage of the main battery has reduced or when the main battery is removed.

In a preferred embodiment of the invention, an electronic instrument comprises a microcomputer, operating units, a main battery, means for detecting presence and absence of the main battery, a backup battery, means provided for outputting signals indicating the presence and absence of the backup battery, and means for detecting the voltage of the main battery. In this embodiment the backup battery takes over the function of the main battery when the main battery is removed or its voltage reduces, so that the operating units may be given instructions to maintain the instrument in a properly operating condition.

Furthermore, an electronic instrument having a small-load circuit and a great-load circuit is arranged to operate properly when the output of a main battery reduces.

BRIEF DESCRIPTION OF THE DRAWINGS

FIGS. 7A is a flow chart of the microcomputer in FIG. 1 showing a subroutine of BC counts 1 and 2, FIG. 7B is a flow chart of the microcomputer in FIG. 1 showing timer interrupt, FIG. 10 is flow chart of the microcomputer in FIG. 1 executed when neither the main battery nor the backup battery is loaded and then one of them is loaded, FIG. 15 is a sectional view of a battery chamber according to the present invention, FIGS. 16A and 16B are sectional views of a modified battery chamber.

DETAILED DESCRIPTION OF THE PREFERRED EMBODIMENT

Figure 1:
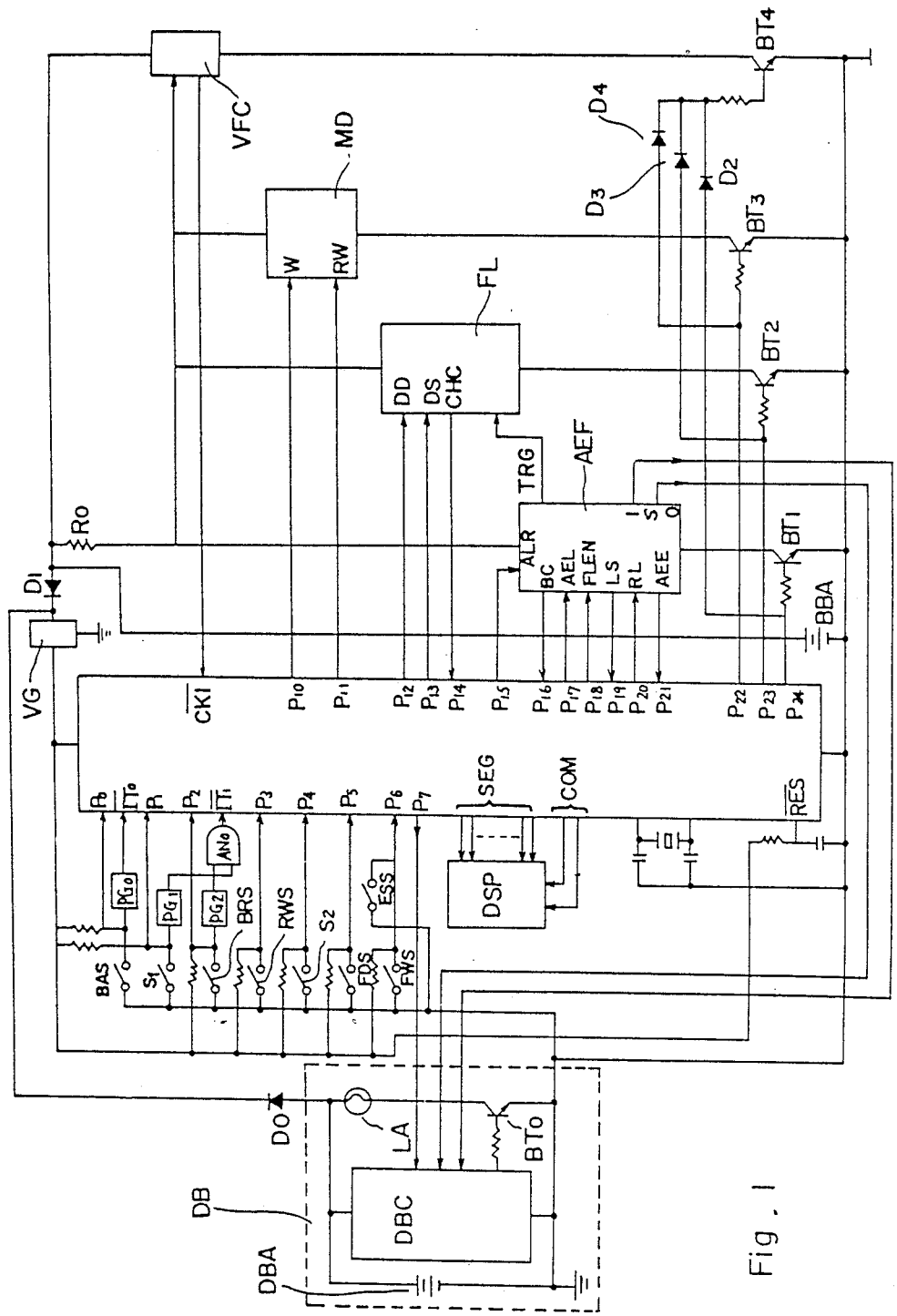
FIG. 1 is a view of a typical overall circuitry of an electronic instrument embodying the present invention.

FIG. 1 is a block diagram showing an overall circuitry of a camera employing the present invention. A data imprinting section DB enclosed by a dotted line is disposed on the back lid of the camera and the remaining circuits are disposed in the main body of the camera. The data imprinting section DB has a data back battery DBA for directly supplying power to a data imprinting circuit DBC, a data imprinting lamp LA and a transistor BT0. A main battery BBA is provided in the main body of the camera for supplying power to a circuit AEF for automatic exposure control and automatic focus control, an electronic flash circuit FL, a motor drive circuit MD, and a voltage-frequency converter circuit VFC. Further the batteries DBA and BBA supply power through diodes D0, D1 and a stepdown circuit VG to a microcomputer MC, pullup resistors of switches, pulse generators PG0, PG1, PG2 and an AND gate AN0. The power supply for the microcomputer MC is continued by the battery DBA even when the main battery BBA is removed. Therefore, without the main battery BBA the microcomputer MC is operable to maintain data (such as the number of frames having been exposed) in the RAM of the microcomputer MC. In other words, the battery DBA acts as a backup battery for the main battery BBA. Under normal circumstances, the main battery BBA has a higher output voltage than the battery DBA in the data imprinting section DB and current does not flow from the battery DBA to the microcomputer MC. The main battery BBA comprises a pair of lithium batteries which have been used in cameras extensively in recent years and which together output 6 volts. The battery DBA comprises a pair of silver oxide batteries or lithium batteries which together output 3 volts.

The data imprinting circuit DBC includes an electronic clock circuit, liquid crystal display (LCD) panel for the indication and a LCD panel for the data imprinting. Upon receipt of a pulse output from a terminal P7 of the microcomputer MC synchronously with the start of an exposure control operation, the transistor BTo becomes conductive for a time corresponding to ISO sensitivity value transmitted in 2 bits from the circuit AEF of the main body, to energize the lamp LA and effect data imprinting onto a film through the imprinter LCD panel. The data imprinting section DB are connected to the circuits in the main body of the camera by five lines, and these connecting lines may be connected by a connector operable when the back lid is closed or may be directly connected as illustrated in FIG. 1 by means of a flexible printed circuit board provided at a mechanical connecting member.

The circuits in the main body of the camera will be described next. Switch BAS is operable with loading of the main battery BBA, which is opened when the main battery BBA is loaded and is closed when the battery BBA is removed. The pulse generator PG0 produces a "Low" pulse when a rise and a fall of the levels of the input signals occur with the opening and closure of this switch BAS. This pulse is input to an interrupt terminal $\overline{ITO}$ of the microcomputer MC, and with the rise of the pulse an interrupt occurs to the microcomputer MC. The opening or closure of the switch BAS is judged by a terminal P0 of the microcomputer MC. Switch S1 is a metering switch which is closed by a first-step depression of a shutter release button, not shown. The pulse generator PG1 outputs a "Low" pulse with a fall of the level of the input signal due to the closure of the metering switch S1, and this pulse is input to an interrupt terminal IT1 through the AND gate AN0. The opening or closure of the metering switch S1 is judged by a terminal I1 of the microcomputer MC. Switch BKS is operable with the opening and closure of the back lid, which is opened when the back lid is closed and is closed when the back lid is opened. The pulse generator PG2 outputs a "Low" pulse by signals of both a rise and a fall resulting from the opening and closure of the switch BKS, and this pulse likewise is input to the interrupt terminal IT1 through the AND gate AN0. The opening and closure of the switch BKS is judged by a terminal P2 of the microcomputer MC.

Switch RWS is a rewind switch which is closed upon mechanical detection of an overload occurring while a film is wound up after exposure of its final frame. When the rewind switch RWS is closed, a terminal P3 turns "Low" and the microcomputer MC effects a rewind operation. When the rewind operation is completed, the rewind switch RWS is mechanically opened. Switch S2 is a release switch which is closed by a second-step depression of the shutter release button. The opening or closure of this switch S2 is judged by a terminal P4 of the microcomputer MC. Switch FDS is a film detecting switch disposed adjacent to a film rail, which is normally closed and is opened when the back lid is closed with a film being present adjacent to the film rail. The opening and closure of this switch FDS is judged by a terminal P5 of the microcomputer MC. The closure of this switch FDS during the rewind operation indicates completion of the film rewinding, and the rewind operation is stopped thereby. Switch ESS is a switch which is closed upon start pf charge of a lens drive mechanism for automatic focus adjustment and is opened upon completion of charge of the drive mechanism. Switch FWS is a switch which is closed upon start of film windup and is opened upon completion thereof. These two switches ESS and FWS are connected in parallel with each other to a terminal P6 of the microcomputer MC, and the terminal P6 turns "Low" if one of them is closed. When the terminal P6 is "Low" the microcomputer MC effects charging of a film winding mechanism and automatic exposure and focus control mechanism.

Figure 2:
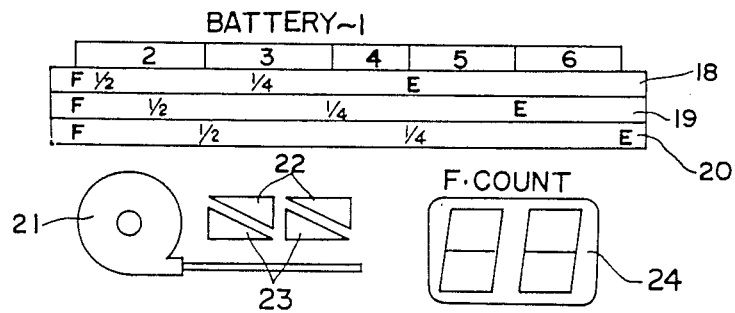
FIG. 2 is a view showing details of an indicator in the instrument shown in FIG. 1.

A LCD panel DSP in the main body is operable in response to signals from segment terminals SEG and common terminals COM of the microcomputer MC. FIG. 2 shows an example of contents displayed by the indicator DSP. Referring to FIG. 2, numeral 1 denotes characters BATTERY indicating that the main battery BBA is loaded in the camera. Numerals 2 to 6 denote bar indicia for showing consumption of the battery BBA. Numerals 18 to 20 denote thermal liquid crystals coated on the LCD panel DSP for respectively indicating the current capacity of the main battery BBA with termperature. Liquid crystal 18 turns on at low temperature, liquid crystal 19 turns on at normal temperature, and liquid crystal 20 turns on at high temperature. These indication with temperature are provided because the internal resistance, chemical reaction and other functions of the battery BBA vary with temperature variations whereby the energy capacity of the battery varies. Instead of the thermal liquid crystals 18 to 20, their indications may be printed directly onto the panel DSP or electrically operable liquid crystals may be provided in the panel DSP and one of which is lit in response to electrical detection of a temperature.

The current capacity of the battery BBA is assumed to be 1118 mA hour at low temperature (−10 C., for example), 1305 mA hour at normal temperature (20 C., for example) and 1491 mA hour at high temperature (50 C., for example). When the battery BBA is loaded all of the bar indicating sections 2 to 6 are lit, assuming that the battery BBA is not consumed at all immediately after the loading. When a current of 746 mA hour has been consumed, the bar indicating section 2 goes out, showing that just a half energy capacity remains for high temperature and less than a half remains for normal and low temperatures. When a current of 979 mA hour has been consumed, the bar indicating section 3 goes out, showing that a little more than one fourth of the total capacity remains for high temperature, exactly one fourth remains for normal temperature, and almost none remains for low temperature.

When a current of 1118 mA hour has been consumed, the bar indicating section 4 goes out, showing that exactly one fourth remains for high temperature, little remains for normal temperature and all the capacity has been consumed for low temperature. When a current of 1305 mA hour has been consumed, the bar indicating section 5 goes out, showing that little remains for high temperature and all the capacity has been consumed for normal temperature. When a current of 1491 mA hour has been consumed, all of the bar indicating sections 2 to 6 are out, indicating that all the capacity has been consumed for high temperature also. The foregoing indication for each temperature corresponds to what remains of the capacity of the battery for continued use at that temperature. Therefore, when only the bar indicating sections 5 and 6 are lit showing that all the capacity of the battery has been exhausted for low temperature, pictures may still be taken by using that battery if the temperature rises to increase the battery capacity. Further, this indication simply shows an extent to which the battery has been consumed, and does not indicate a precise of what remains of the battery capacity since there is variation in battery quality and use of the battery up to that time. Therefore, it may still be possible to take pictures even if an indication is given that all the battery capacity has been exhausted, and it may not be possible to take pictures even if an indication is given that something still remains of the battery capacity. While the thermal liquid crystals 18 to 20 in FIG. 2 are adapted to show remaining battery capacity, they may be adapted to show amounts of use up to the time. Further, instead of remaining battery capacity, an indication may be provided showing, for example, how many rolls of 24-frame film correspond to the battery capacity may still cover (assuming a predetermined ratio between flash photography and non-flash photography). In the case of a camera for which four SUM-4 alkaline manganese batteries (6 volts) may be used in place of the two lithium batteries (6 volts), indicators relating to the alkaline manganese batteries may be provided in addition to the indicators 18 to 20. Alternatively, upon detection of the four alkaline manganese batteries being loaded, the above-mentioned values of battery capacity may be replaced with, for example, 1200 mA hour for normal temperature to be used as reference for indicating remaining battery capacity with temperature.

The LCD panel DSP indicator of FIG. 2 includes a film load indicator 21. The microcomputer MC, taking into account other conditions such as a command for turning off all the indications, turns on this indicator 21 when the film detector switch FDS is opened, and puts out when the switch FDS is closed. A pair of film windup indicators 23 are turned on and off alternately only during the film windup operation, and a pair of film rewind indicators 22 are turned on and off alternately only during the film rewind operation. A film counter 24 indicates the number of exposed frames of the film.

A reset capacitor is interposed between a reset terminal $\overline{RES}$ of the microcomputer MC and a grounding. When power supply for the microcomputer MC is initiated, the microcomputer MC effects a resetting operation to be described later, in response to a reset signal from the reset capacitor. The motor circuit MD receives power supply when a terminal P22 of the microcomputer MC is "High" and a transistor BT3 is conductive. This motor circuit MD is controlled by signals from the terminals P10 and P11 of the microcomputer MC as shown in Table 1.

TABLE 1

| P10 (W) | P11 (RW) | Motor | Camera |
| --- | --- | --- | --- |
| H | H | standstill | |
| L | H | F. rotation | winding-up |
| H | L | B. rotation | rewinding |

TABLE 1-continued

| P10 (W) | P11 (RW) | Motor | Camera |
|---------|----------|-------|--------|
| L | L | | braked |

In the flash circuit FL in FIG. 1, a booster circuit starts the boosting operation when a terminal P12 of the microcomputer MC turns "Low", and stops the operation when terminal P12 turns "High". When a terminal P13 turns "Low", a charge detector circuit in the flash circuit FL starts to detect the voltage level of a main capacitor which stores flashing energy for a flash tube from the booster circuit. The charge detector circuit stops detecting operation when the terminal P13 turns "High" The charge detector circuit inverts a terminal CHC from "Low" to "High" when a charge voltage of the main capacitor exceeds during the boosting operation of the booster circuit to a level greater by a predetermined value than a level corresponding to a guaranteed amount of flash light. When the charge voltage of the main capacitor reduces, because of natural discharge during the non-boosting operation or for other reasons, below the voltage level corresponding to the guaranteed amount of flash light, the charge detector circuit inverts the terminal CHC from "High" to "Low" When a "High" pulse is input from a terminal TRG of the control circuit AEF to the flash circuit FL, the flash tube is triggerred to emit flash light by discharging all the electric charge stored in the main capacitor. That is to say this flash circuit FL always flashes in a substantially constant amount of flash light. Further, this flash circuit FL is operable only when a terminal P23 of the microcomputer MC is "High" and a transistor BT2 is conductive.

The automatic exposure and focus control circuit AEF receives power supply when a terminal P24 of the microcomputer MC is "High" and the transistor BT1 is conductive. When the power supply starts, the control circuit AEF starts the light measurement of an object to be photographed and distance measurement from the camera to the object. Upon lapse of a predetermined time after the start of the power supply, a terminal P17 of the microcomputer MC is inverted from "High" to "Low" whereby the luminance of the object is stored. The distance to the object measured at the start of the power supply is also stored. When the release switch S2 is closed, a "Low" pulse is output from a terminal P20 of the microcomputer MC to the automatic focus control circuit AEF which then starts to drive a lens, not shown, to a position corresponding to the measured distance and stops the lens when the lens reaches that position. Thereafter the control circuit AEF starts a shutter release operation and then counts an exposure time corresponding to the metered luminace and film sensitivity. The shutter is closed when the count ends. This shutter is a lens shutter in which the diaphragm aperture and exposure time change by 0.5 Ev for every 1 Ev change.

This circuit AEF has a voltage detector circuit for checking the output voltage of the main battery BBA. The circuit AEF outputs a "High" signal from a terminal BC when the output voltage of the battery falls below a voltage guaranteeing normal operation of the circuit AEF and outputs a "Low" signal when the output voltage is above the voltage guaranteeing the normal operation. When the exposure value EV determined by the metered luminance and the film sensitivity is below a predetermined value, exposure time is longer than a time in which a blur in the picture takes place. To indicate this blur occurring the circuit AEF outputs a "Low" signal to a terminal P19 of the microcomputer MC. Upon receipt of the "Low" signal at the terminal P19, the microcomputer MC checks whether a charge completion signal is input to a terminal P14 from the flash circuit FL and, if it is, turns a terminal P18 "Low" to enable flashing. If the charging is not completed, a terminal P15 is turned "Low" to operate an alarm circuit in the circuit AFE. The microcomputer MC does not permit the exposure control operation despite the closure of the release switch S2 when the terminal P19 receives the signal ("Low") indicating that the exposure value is below the predetermined value and the terminal P14 receives the signal ("Low") indicating that the charge voltage in the flash circuit FL is below the predetermined value. The circuit AEF further includes a flashmatic circuit which outputs a diaphragm aperture value (Av) signal expressed by the equation $Av = Iv + Sv - Dv$ wherein Iv is a predetermined amount of flash light, Sv is film sensitivity and Dv is a distance value. If the terminal P18 of the microcomputer MC is "Low" the circuit AEF outputs, a "High" pulse to the flash circuit FL from the terminal TRG to cause flashing when the opening of the lens shutter equals the flashmatic aperture value. Upon lapse of a predetermined time after completion of the exposure control operation by the circuit AEF, a "Low" signal is output to a terminal P21 of the microcomputer MC to report that the exposure control operation is completed.

The described motor circuit MD, flash circuit FL, and control circuit AEF receive power supply through a monitoring resistor R0. A voltage corresponding to a current consumed by each of these circuits is output from both ends of the resistor R0. The resistor R0 is set to such a small resistance value that the resulting voltage drop hardly affect these circuits. When any one of the circuits MD, FL and AEF is in operation, a transistor BT4 is conductive to put the voltage-frequency converter circuit VFC into operation, and pulses are output with a frequency corresponding to the voltage drop of the resistor R0. These pulses are input to a terminal $\overline{CKI}$ of the microcomputer MC and falls of the pulses are counted by a 16-bit counter in the microcomputer MC. A circuit constant is set so that one pulse from the voltage-frequency converter circuit VFC corresponds to the consumption of 320 $\mu$ A sec, and the counter can count up to 10.49 A sec. The count value of this counter is stored in a register at the end of each operation of the circuits AEF, FL and MD and is used for indicating the remaining battery capacity noted hereinbefore.

Figure 3:
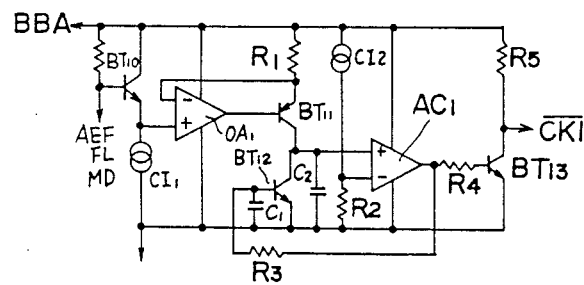
FIG. 3 is a view showing details of a voltage-frequency converter circuit in FIG. 1.

A detailed circuitry of voltage-frequency converter circuit VFC is shown in FIG. 3. The voltage drop by the monitoring resistor Ro is passed through an emitter follower comprising a transistor BT10 and constant current source CI1 to a noninverting input terminal of an operational amplifier OA1. In a circuit composed of the operational amplifier OA1, a resistor R1 and a transistor BT11, the collector current of the transistor BT11 is proportional to the voltage drop of the resistor R0. This current is charged into a capacitor C2. The charging voltage thereof is compared by a comparator AC1 with reference a voltage from a constant voltage source comprising a constant current source CI2 and a resistor R2. When the charging voltage reaches the reference voltage, the comparator AC1 inverts its output from "Low" to "High" putting a transistor BT13 into the conductive state, whereby a fall signal to "Low" is transmitted to the terminal $\overline{CKI}$. A transistor BT12 becomes conductive after a delay time determined by a resistor R3 and a capacitor C1 with the comparator AC1 inverted to "High", thereby discharging the electric charge of the capacitor C2. Then the output of the comparator AC1 turns "Low", the transistor BT13 becomes nonconductive, and the signal to the terminal $\overline{CKI}$ turns "High". Further, the transistor BT12 becomes nonconductive after the delay determined by the resistor R3 and the capacitor C1, and the capacitor C2 is charged again with the collector current of the transistor BT11. Therefore, a train of pulses having a pulse width corresponding to the voltage drop of the monitoring resistor Ro is transmitted from a junction of the transistor BT13 and a resistor R5 to the terminal $\overline{CKI}$ of the microcomputer MC.

Figure 4:
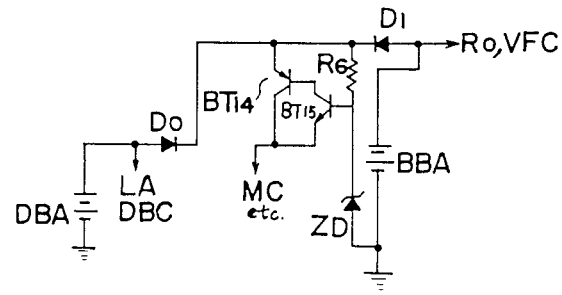
FIG. 4 is a view of a stepdown circuit in FIG. 1, FIGS. 5A and 5B are interrupt flow charts of a microcomputer in FIG. 1 executed when a main battery is loaded and removed.

FIG. 4 shows a detailed circuitry of the stepdown circuit VG of FIG. 1. The current from the main battery BBA flows through the diode D1 and a resistor R6 to a Zener diode ZD. The power supply voltage which is supplied to the microcomputer MC, logic gates and pullup resistor is a constant value subtracted the base-emitter voltage thereof from the Zener voltage, and current is supplied by the transistors BT14 and BT15. As the output voltage of the main battery BBA decreases, the current supplied by the battery DBA increases gradually. When the output voltage of the battery DBA is higher than that of the main battery BBA, the current is supplied mainly by the battery DBA. When the main battery BBA is removed, naturally the current is supplied only by the battery DBA. The battery DBA has a 3-volt output which is reduced to drive the microcomputer MC, and therefore the microcomputer MC and the logic gates should preferably be the 0–1.5 volt type.

Figure 5A:
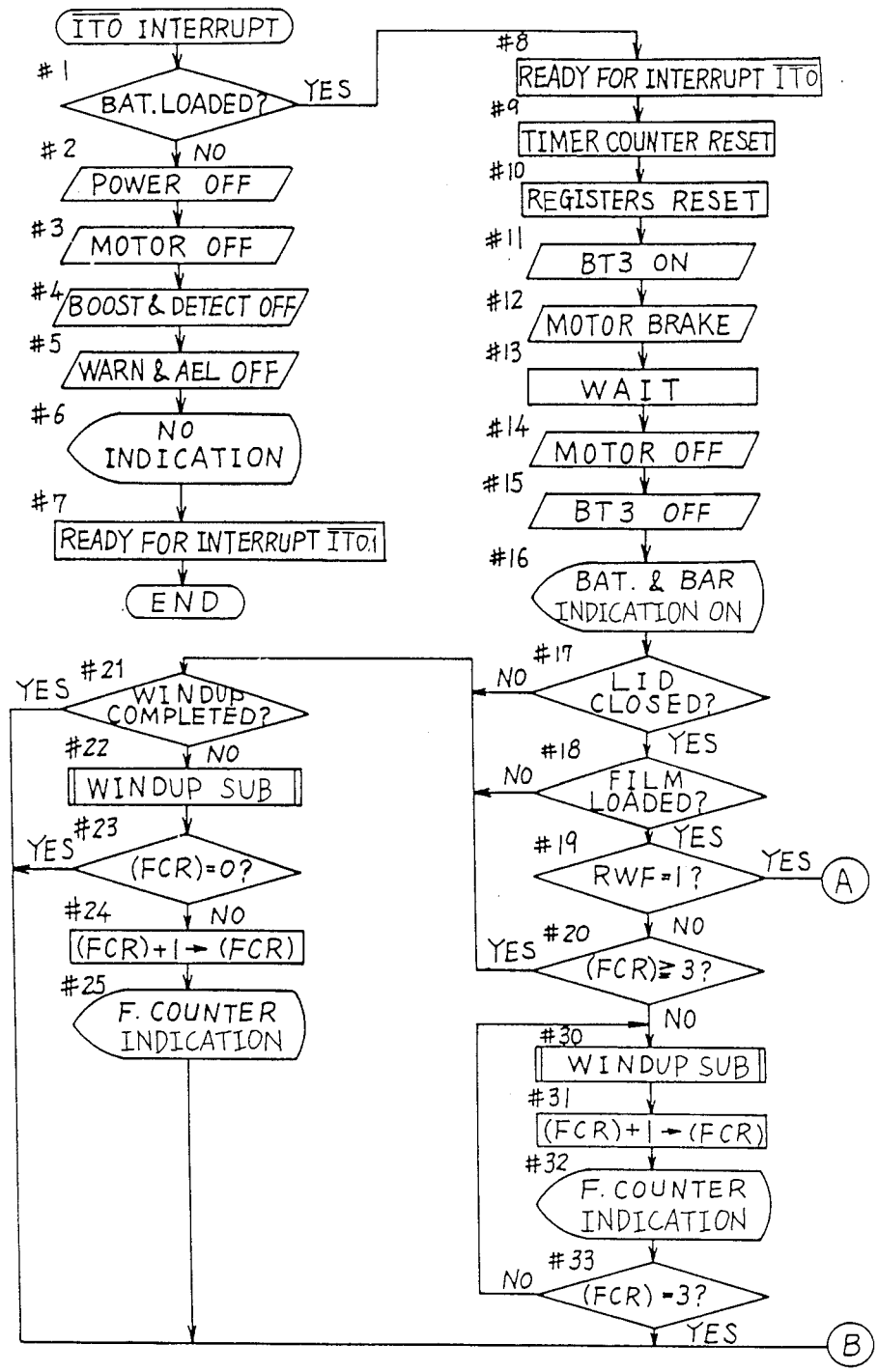
Figure 5B:
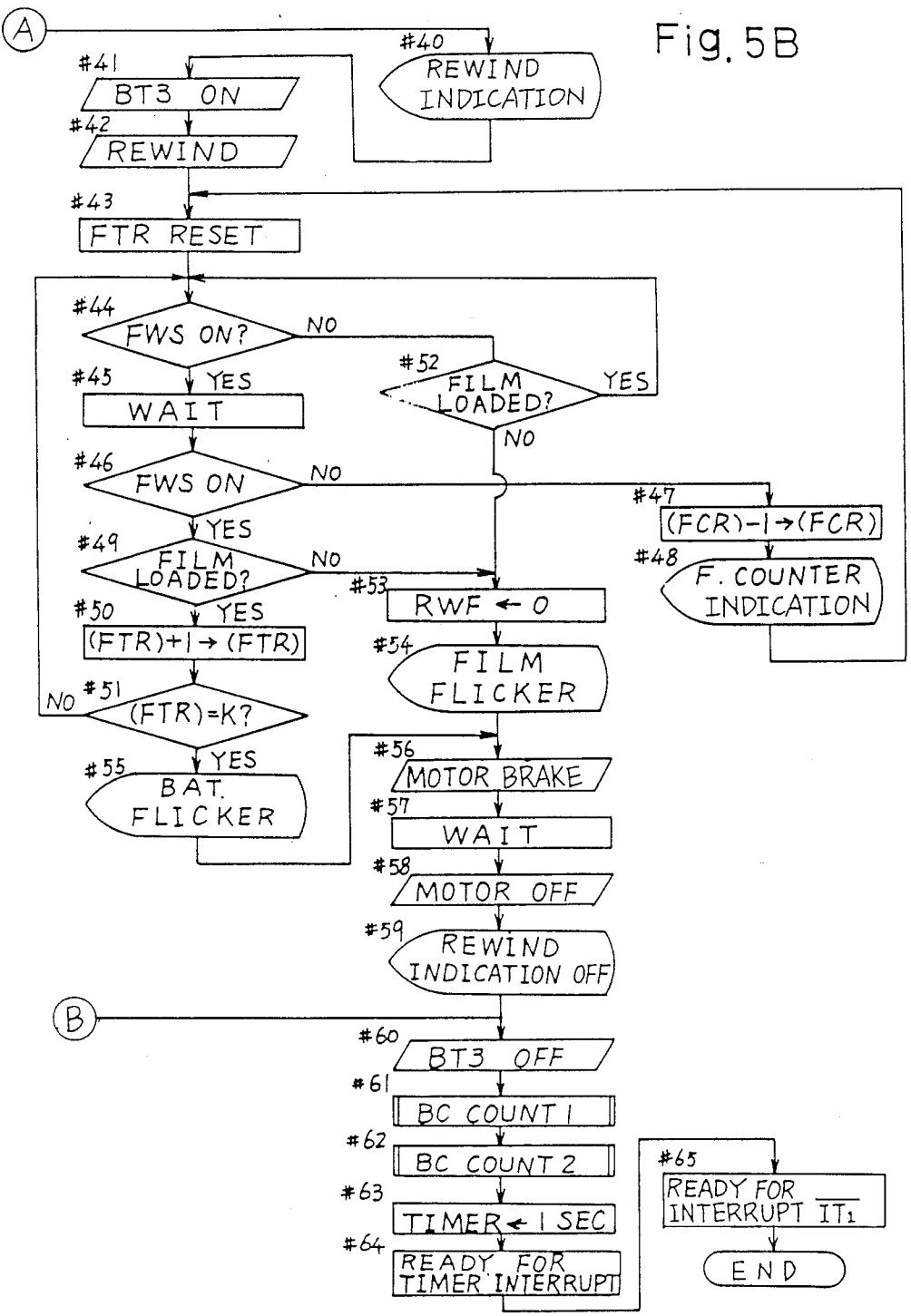

The operation of the circuitry of FIG. 1 will be described hereinafter with reference to the flow charts of FIGS. 5 et seq showing the operation of the microcomputer MC. When the main battery BBA is loaded or removed, the switch BAS turns on or off and the pulse generator PG0 outputs a "Low" pulse to the interrupt terminal $\overline{ITO}$. Then the microcomputer MC starts the operation of the flow chart shown in FIG. 5. At step #1 the microcomputer MC judges whether the main battery BBA is loaded or removed and, if it is removed, proceeds to step #2. Then microcomputer MC initializes the output terminals P7, P10, P11, P12, P13, P15, P17. P18, P20, P22, P23 and P24, stops the operation of the control circuit AEF, flash circuit FL, motor circuit MD, voltage-frequency converter circuit VFC and the imprinting operation of the data imprinting section DB. Then the microcomputer MC deenergizes all the indications shown in FIG. 2 to indicate that the main battery BBA is not loaded, puts the terminals $\overline{ITO}$ and $\overline{IT1}$ ready to receive interrupt signals, and stops the operation (steps #2 to 7).

If at step 1 the battery BBA is judged to be loaded, the microcomputer MC moves to step 8 to put the interrupt terminal $\overline{ITO}$ ready to receive the interrupt signal. This is for executing steps #1 to 7 immediately upon removal of the battery BBA during the operation. Next, the internal timer and counter are reset and registers BCR0 to BCR3 for storing battery current consumption are reset (steps #9 and 10). The timer counts time of a reference clock formed in the microcomputer MC, and takes action from a certain address if a timer interrupt is allowed when a predetermined time is counted. The counter counts pulses input to the terminal from the converter circuit VFC $\overline{CKI}$. The registers BCR0 to BCR3 are each an 8-bit register and constitute a 32-bit counter. Each of these registers has a zero bit given weight such that the zero bit of the register BCR0 corresponds to the current consumption of 5 μA sec, register BCR1 1.28 mA sec, register BCR2 327.7 mA sec, and register BCR3 23.3 mA hour respectively. Each bit is given weight as shown in Table 2.

TABLE 2

| Registers | Bits | Weights |
|---|---|---|
| | 7 | 2983 mA hour |
| | 6 | 1491 mA hour |
| | 5 | 745.7 mA hour |
| | 4 | 372.8 mA hour |
| BCR3 | 3 | 186.4 mA hour |
| | 2 | 93.2 mA hour |
| | 1 | 46.6 mA hour |
| | 0 | 23.3 mA hour |
| | 7 | 11.7 mA hour |
| | 6 | 5.8 mA hour |
| BCR2 | 5 | 2.9 mA hour |
| | 4 | 1.5 mA hour |
| | 3 | 2621 mA sec |
| | 2 | 1311 mA sec |
| | 1 | 655.4 mA sec |
| | 0 | 327.7 mA sec |
| | 7 | 163.8 mA sec |
| | 6 | 81.92 mA sec |
| | 5 | 40.96 mA sec |
| BCR1 | 4 | 20.48 mA sec |
| | 3 | 10.24 mA sec |
| | 2 | 5.12 mA sec |
| | 1 | 2.56 mA sec |
| | 0 | 1.28 mA sec |
| | 7 | 640 μA sec |
| | 6 | 320 μA sec |
| | 5 | 160 μA sec |
| BCR0 | 4 | 80 μA sec |
| | 3 | 40 μA sec |
| | 2 | 20 μA sec |
| | 1 | 10 μA sec |
| | 0 | 5 μA sec |

At steps #11 to 15 the motor circuit MD is operated to brake the motor for a time by short-circuiting opposite terminals of the motor. The lithium battery sometimes does not operate properly after leaving it out of use for a long time. This state may be rectified by flowing a great current at the start of its use, and steps #11 to 15 are provided for the time of loading the battery. Since the motor is braked against rotation, no malfunction of the camera will occur. After the braking of the motor is completed, the "BATTERY" indicator 1 and bar indicators 2 to 6 are lit at step #16, and the program moves to step #17.

At steps #17 to 20 the opening ro closure of the back lid and the loading of the film are judged. Step #21 will follow if the back lid is open (step #17), if the film is not loaded (step #18), or if the film is loaded and its preliminary advance is completed (steps 5 #19 and #20). If the film is loaded and needs to be rewound, the program jumps from step #19 (with a flag RWF at "1") to step #40. If the preliminary advance is not completed, the program jumps from step #20 (with a register FCR <3) to step #30. At this time the flag RWF is set to "1" when the rewind switch RWS is turned on by a clutch mechanism owing to stretching of the final frame of the film occurring during the film windup, and remains at "1" till completion of film rewinding. The register FCR is a register for the film counter, which remains at "0" as long as the back lid is open and is incremented by "1" when the back lid is closed and the loaded film is wound up. Only the preliminary film windup takes place until the register FCR indicates "3". At step 21 whether the film windup is completed or not is judged and, if it is, the program immediately jumps to step #60. If the film windup is not completed, it means that the battery has been changed during the film winding and a film windup subroutine is executed at step #22. Step #60 follows immediately if a film is not loaded or if the back lid is open with the register FCR indicating "0" If the register FCR indicates "1" or more, "1" is incremented to this count at step #24 to give a film counter indication according to this count and the program moves to step #60. If step 20 judges that the film is in the course of preliminary advance, the program moves to step #30 to execute the film windup subroutine. Then the count of register FCR is incremented with "1", and at step #32 a film counter indication is given in accordance with this count and a judgment is made whether the register FCR indicates "3" or not. If "3" is indicated step #60 follows. If not, steps 30 et seq are repeated until "3" is indicated. The relationship between the counts of register FCR and the film counter indicator 24 is shown in Table 3.

TABLE 3

| FCR | Indicator 24 |
| --- | --- |
| 00H | □ |
| 01H | — |
| 02H | — |
| 03H | 1 |
| 04H | 2 |
| 05H | 3 |
| ⋮ | ⋮ |
| 26H | 36 |
| 27H | 37 |
| 28H | 38 |
| 29H | 39 |

Figure 6:
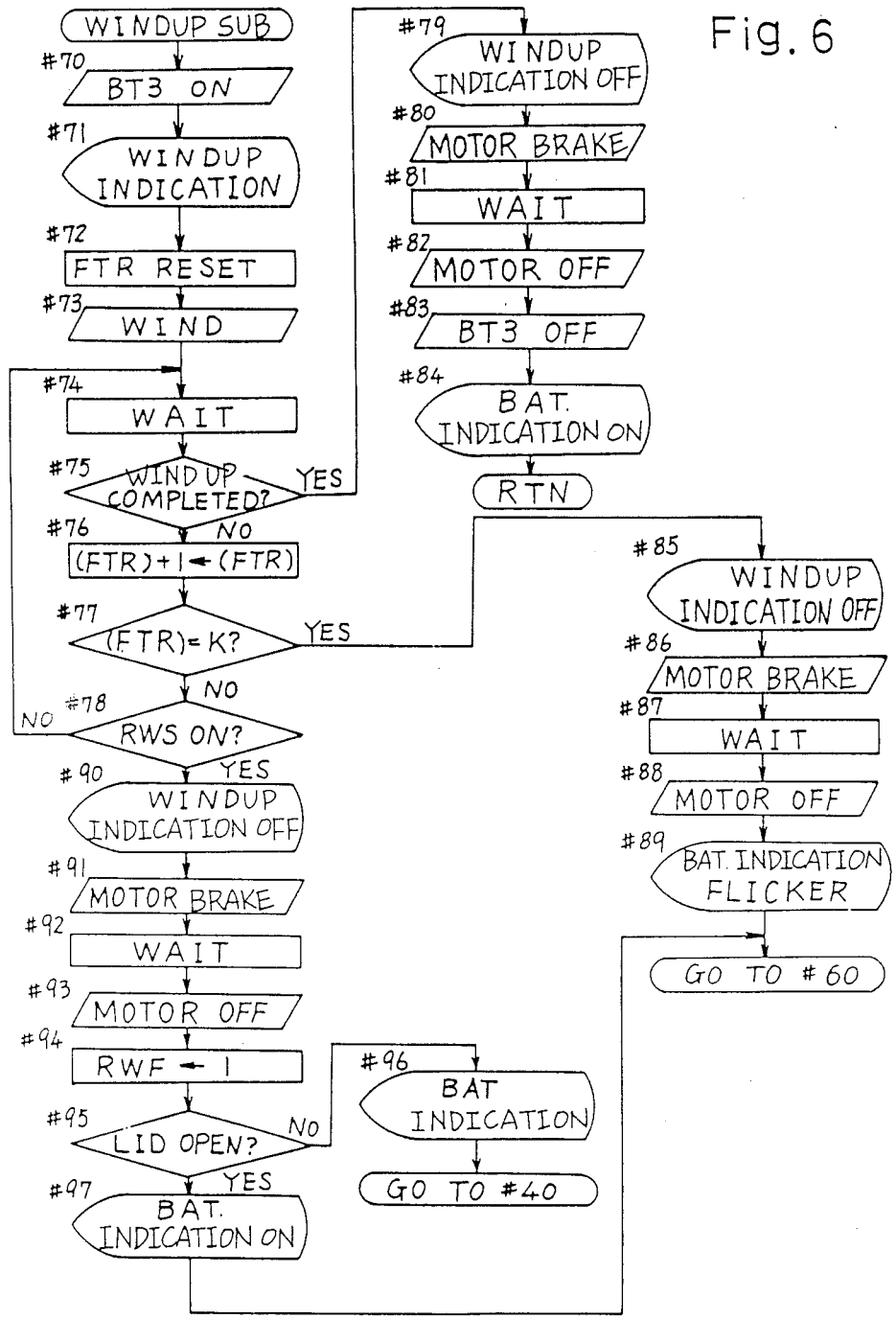
FIG. 6 is a flow chart of the microcomputer in FIG. 1 showing a film wind up subroutine.

The film windup subroutine of steps #20 and #30 will now be described with reference to FIG. 6. At step #70 the transistor BT3 is turned on to render the motor drive circuit MD operable. At step #71 the indicator 23 gives the film windup indication, and then at step #72 a register FTR is reset. This register FTR is a timer register for judging whether the film is wound up or rewound by one frame within a predetermined time. At step #73 the film windup operation is started, and after waiting for a time judgment is made whether the terminal P6 is "High" in other words whether the windup is completed (steps #74 and #75). If the windup is not completed, the count of the register FTR is incremented by "1" and whether its count is "K" or not is judged (steps #76 and #77). If "K" is not indicated, step #78 judges whether the film is stretched and the rewind switch RWS is turned on. If it is not turned on, the program returns to step #74. Steps #74 to 78 are repeated and, if completion of the windup is detected then, step #79 follows. If lapse of a predetermined time is detected, step #85 follows. And the rewind switch RWS is turned on, step #90 follows.

If the windup is completed, the film windup indication 23 is turned off at step #79, and thereafter the motor is braked for a predetermined time, the transistor BR3 is turned off, the "BATTERY" indication 1 is turned on (steps #80 to 84) and the program returns to the main routine. If at step #77 the register FTR is judged to have reached "K" without the film windup being completed, the program moves to step 85. Then the film windup indicator 23 is turned off, the motor is braked for the predetermined time, the "BATTERY" indicator 1 is flickered to warn that the film windup has not been completed within the prescribed time (steps #85 to 89), and the program moves to step #60 in FIG. 5. If at step #78 the rewind switch RWS is judged to be closed, the program moves to step #90. Then the film windup indicator 23 is turned off, the motor is braked for the predetermined time and the motor is turned off (steps #90 to 93). Thereafter the flag RWF is set to "1" (step #94) and at step #95 whether the back lid is open or not is judged. If the back lid is open, the "BATTERY" indicator 1 is turned on (step #97) and the program moves to step #60 in FIG. 5. If the back lid is closed, the program moves to step #40 in FIG. 5 after turning on the "BATTERY" indicator at step #96. The "BATTERY" indicator 1 is turned on at steps #84, #96 and #97 in order to indicate that the battery BBA is in working order for enabling proper film windup after the "BATTERY" indicator 1 is flickered upon judgment that the battery has run out and thereafter the battery has made a recovery owing to a temperature change or for some other reason.

Steps #40 et seq in FIG. 5 executed upon determination at step #19 or at steps #78 and #95 that the rewind operation is to be carried out will be described next. At step #40 the rewind indicator 22 is turned on, and at step #41 the transistor BT3 is turned on. Then the rewind operation is started and the timer register FTR is reset (steps #42 and #43). If the windup switch FWS is judged to be off at step #44, the program moves to step #52. If it is on, the program moves to step #45.

At step #52 judgment is made whether the film is returns to step #44 and waits until the windup switch FWS is turned on. When the windup switch FWS is turned on, the program waits at step #45 for a predetermined time to lapse, and judges at step #46 again whether the windup switch FWS is turned on or not. If the windup switch FWS is turned on, step #49 judges whether there is the film or not. If there is, the count of the register FTR is incremented by "1" and judgment is made whether the register FTR has reached "K" (steps #50 and #51). If "K" is not indicated, the program returns to step #44 to repeat the same operation. Thus, while the film is rewound by one frame, the program first waits for the windup switch FWS to turn on and, after it turns on, judges whether the switch FWS turns off within a predetermined time. If the windup switch FWS turns off within the predetermined time, the program moves from step #46 to step #47 to decrement "1" from the count of the register FCR and, after the film counter 24 indicates this count (step #48), returns to step #43 to reset the timer register FTR. If at step #51 the register FTR reaches "K" and the film is not wound up by one frame within the predetermined time, step #55 causes the "BATTERY" indicator 1 to flicker by way of warning that the battery has exhausted and step #56 follows. If at steps #49 and #52 the film detector switch FDS mounted in a film passage stops detecting the film (or turns on), the flag RWF is set to "0" at step #53 and the film indicator 21 is flickered at step #54 to indicate that the film rewinding is completed. AT steps #56 to 59 the motor is braked for the predetermined time and the rewind indicator 22 is turned off, and the program moves to steps #59 and Steps #60 et seq are the steps executed whenever the entire circuitry of FIG. 1 completes the operation. At step #60 the transistor BT3 is turned off to render the motor circuit MD inoperative. At steps #61 and #62 subroutines BC count 1 and BC count 2 shown in FIG. 7 are executed. At step #63 the timer is set with 1 second data, enabling a timer interrupt and an interrupt at the terminal $\overline{IT1}$ (steps #64 and #65), and the microcomputer MC stops operating.

The subroutines BC count 1 and BC count 2 and the timer interrupt operation will be described next with reference to FIG. 7. The operations shown in FIG. 7 are effected for storing current consumption to give indications at the bar indicators 2 to 6. BC count 2 is an operation for storing current consumption of the control circuit AEF, flash circuit FL and motor circuit MD. BC count 1 is an operation for storing current consumption while the microcomputer MC is in action. The timer interrupt is an operation for storing current consumption while the microcomputer MC is out of action. The subroutine of BC count 2 increments the 32-bit counter BCR3-BCR0 with the count of pulses input to the terminal $\overline{CKI}$ by the converter 25 circuit VFC which are counted by the 16-bit counter (step #100). In this case one pulse is set to 320 μA sec. and each bit of each register is given weight as shown in Table 4.

TABLE 4

| Bits | Weights | Registers |
|---|---|---|
| 15 | 10.49 A sec | BCR2 |
| 14 | 5.24 A sec | |
| 13 | 2.62 A sec | |
| 12 | 1.31 A sec | |
| 11 | 655 mA sec | BCR1 |
| 10 | 328 mA sec | |
| 9 | 163.84 mA sec | |
| 8 | 81.92 mA sec | |
| 7 | 40.96 mA sec | |
| 6 | 20.48 mA sec | |
| 5 | 10.24 mA sec | |
| 4 | 5.12 mA sec | |
| 3 | 2.46 mA sec | |
| 2 | 1.28 mA sec | |
| 1 | 640 μA sec | BCR0 |
| 0 | 320 μA sec | |

Thus, each bit of the counter is added to the corresponding register and the program moves to step #102.

BC count 1 is for storing current consumption while the microcomputer MC is in action

TABLE 5

| BCR 3 | | | | | | Current | Indication | | | |
|---|---|---|---|---|---|---|---|---|---|---|
| $b_6$ | $b_5$ | $b_4$ | $b_3$ | $b_2$ | $b_1$ | Consumption | 18 | 19 | 20 | Indicator |
| 0 | 0 | 0 | 0 | 0 | 0 | 0 m A h | F | F | F | |
| 0 | 0 | 0 | 0 | 0 | 1 | 47 m A h | | | | |
| 0 | 0 | 0 | 0 | 1 | 0 | 93 m A h | | | | |
| 0 | 0 | 0 | 0 | 1 | 1 | 140 m A h | | | | |
| 0 | 0 | 0 | 1 | 0 | 0 | 186 m A h | | | | |
| 0 | 0 | 0 | 1 | 0 | 1 | 233 m A h | | | | |
| 0 | 0 | 0 | 1 | 1 | 0 | 280 m A h | | | | |
| 0 | 0 | 0 | 1 | 1 | 1 | 326 m A h | | | | |
| 0 | 0 | 1 | 0 | 0 | 0 | 373 m A h | | | | 2 |
| 0 | 0 | 1 | 0 | 0 | 1 | 419 m A h | | | | |
| 0 | 0 | 1 | 0 | 1 | 0 | 466 m A h | | | | |
| 0 | 0 | 1 | 0 | 1 | 1 | 513 m A h | | | | |
| 0 | 0 | 1 | 1 | 0 | 0 | 559 m A h | ½ | | | |
| 0 | 0 | 1 | 1 | 0 | 1 | 606 m A h | | | | |
| 0 | 0 | 1 | 1 | 1 | 0 | 652 m A h | | ½ | | |
| 0 | 0 | 1 | 1 | 1 | 1 | 699 m A h | | | | |
| 0 | 1 | 0 | 0 | 0 | 0 | 746 m A h | | | ½ | |
| 0 | 1 | 0 | 0 | 0 | 1 | 792 m A h | | | | |
| 0 | 1 | 0 | 0 | 1 | 0 | 839 m A h | ½ | | | |
| 0 | 1 | 0 | 0 | 1 | 1 | 885 m A h | | | | 3 |
| 0 | 1 | 0 | 1 | 0 | 0 | 932 m A h | | | | |
| 0 | 1 | 0 | 1 | 0 | 1 | 979 m A h | | ½ | | |
| 0 | 1 | 0 | 1 | 1 | 0 | 1025 m A h | | | | |

TABLE 5-continued

| BCR 3 | | | | | | Current | Indication | | | |
|---|---|---|---|---|---|---|---|---|---|---|
| $b_6$ | $b_5$ | $b_4$ | $b_3$ | $b_2$ | $b_1$ | Consumption | 18 | 19 | 20 | Indicator |
| 0 | 1 | 0 | 1 | 1 | 1 | 1072 m A h | | | | 4 |
| 0 | 1 | 1 | 0 | 0 | 0 | 1118 m A h | E | | ½ | |
| 0 | 1 | 1 | 0 | 0 | 1 | 1165 m A h | | | | |
| 0 | 1 | 1 | 0 | 1 | 0 | 1212 m A h | | | | 5 |
| 0 | 1 | 1 | 0 | 1 | 1 | 1258 m A h | | | | |
| 0 | 1 | 1 | 1 | 0 | 0 | 1305 m A h | | E | | |
| 0 | 1 | 1 | 1 | 0 | 1 | 1351 m A h | | | | |
| 0 | 1 | 1 | 1 | 1 | 0 | 1398 m A h | | | | 6 |
| 0 | 1 | 1 | 1 | 1 | 1 | 1445 m A h | | | | |
| 1 | 0 | 0 | 0 | 0 | 0 | 1491 m A h | | | E | |

The microcomputer MC is assumed to consume a 1.28 mA sec current while in action. Assuming that the 8th bit of the 16-bit timer reaches "1" in one second, it can count up to 255 seconds, and this is sufficient considering the operation of the camera. The weight given to each bit of the 16 bit timer corresponds to the weight given to each bit of the registers BCR0 and BCR1.

Thus, the output of the timer is added as it is to the 16-bit counter BCR3 to BCR0 (step #101) and the program moves to step #102. At step #102 data of bits 6 to 1 of the register BCR3 are decoded for bar indication, at step #103 results of the decoding are indicated at the bar indicators, and the program returns to the main routine. The decoding at step #102 is as shown in Table 5.

The microcomputer MC carries out the decoding according to Table 5, shows the results at the bar indicators and returns to the main routine.

The timer interrupt takes place every second while the microcomputer MC is out of action. It is assumed that the entire circuitry consumes a 5 μA current per second while the microcomputer MC is out of action. When the timer interrupt takes place upon lapse of one second, the count of the register BCR0 is incremented by "1" at step #120. And if there is no carry at step #121, step #129 will follow. If there is a carry, the count of the register BCR1 is incremented by "1" (step #122) and, if step #123 judges that there is no carry, step #129 will follow. If there is a carry at step #123, then the count of the register BCR2 is incremented by "1" (step #124). If there is no carry at step #125, then step #129 will follow. If there is a carry at step #125, the count or the register BCR3 is incremented by "1" (step #126), bits 6 to 1 of the register BCR3 are decoded according to Table 5 (step #127), the results are indicated at the bar indicators at step #128, and step #129 follows. At step #129 the timer is set with 1 second data, the timer interrupt and the interrupt at the terminal $\overline{IT0}$ and $\overline{IT1}$ are allowed, and the subroutine comes to an end.

Operations taking place when the interrupt signal is input to the terminal $\overline{IT1}$ will be described next with reference to FIGS. 8 and 9. When the interrupt signal is input to the terminal $\overline{IT1}$, step #140 judges whether any of the transistors BT1 to BT3 is turned on. (Under normal circumstances, only the transistor BT2 is turned on, but the conditions of the above three transistors are checked for safety's sake.) If any of the three transistors is turned on, it means that the booster operation of the flash circuit FL has been effected up to that time and step #141 will follow. If none of them are turned on, it means that the microcomputer MC is out of action and step #146 will follow. At steps 141 et seq the transistors BT1 to BT3 are turned off, the booster operation and charge completion detection are stopped, and the forgoing subroutines BC count 1 and BC count 2 are executed (steps #141 to 145). At step #146 the counter and timer are reset to be ready to receive an interrupt relating to loading of the battery BBA (step #147), and at step #148 judgment is made whether the metering switch S1 is closed or not. If the metering switch S1 is not closed, it means that the back lid is either closed or opened and step #220 in FIG. 9 will follow. If the metering switch S1 is closed, judgment is made whether the main battery BBA is loaded or not (step #149 If the main battery BBA is not loaded, all the indications are turned off (step #150) to prevent consumption of the battery DBA and to warn that the main battery BBA is not loaded. Thus, the terminal is made ready for an interrupt and the microcomputer MC stops operating (step #151).

If at step #149 the battery BBA is judged to be loaded, step #152 follows to judge if the flag RWF is at "1" If the flag RWF indicates "1", then the program returns to step #40 to effect the rewind operation. If the flag RWF indicates "0", judgment is made at step #152 whether the film windup is completed or not. If the film windup is not completed, a film windup subroutine is executed at step #154 and the opening and closure of the metering switch S1 is judged at step #155. If the switch S1 is on, step #156 follows. If the switch S1 is off, the program returns to step #60 in FIG. 5 to carry out the foregoing operation and the microcomputer MC goes out of action. The case where the switch S1 is turned on and the film windup or rewinding is not completed occurs when the film windup or rewind is not completed within the predetermined time because of exhaustion of the main battery BBA. If in this case the proper rewinding is effected at steps #40 et seq or the proper windup is effected at step #154, the "BATTERY" indicator 1 which has been flickering till then will become lit in a continuous manner. Otherwise, the "BATTERY" indicator 1 will keep flickering.

If the rewinding operation is not stopped halfway (step #152) or if the windup operation is not stopped halfway (step #153) or if the windup operation is stopped halfway but a proper windup is effected and the metering switch S1 is turned on (step #155), the program moves to step #156 and turns on the transistors BT1 and BT2 to place the control circuit AEF and flash circuit FL in the operative condition. At step #157 whether or not the supply voltage of the main battery BBA is proper is judged from the signal input to the terminal P16 from the control circuit AEF (step #157). If the supply voltage is not proper, the "BATTERY" indicator 1 is flickered by way of warning, and the transistors BT1 and BT2 are turned off (steps 58 and #159). The program then returns to step #60 and the microcomputer MC stops operating. If step #157 judges that the supply voltage of the main battery BBA is proper, step #160 lights the "BATTERY" indicator 1 and step #162 outputs a signal to the terminal P17 for storing the meter output after waiting for a predetermined time (i.e. a time necessary for stabilization of meter output and distance measurement). Subsequently, at step #163 judgment is made from the output of the terminal P19 if the exposure time will exceed a predetermined time. If the exposure time is within the predetermined time, step #164 follows to turn off the transistor BT2 whereby the flash circuit FL becomes inoperable so that a flash permitting signal will not be output (step #165), which is followed by step #175. If step #163 judges that a signal is input from the terminal P19 indicating that the exposure time exceeds the predetermined time, the program moves to step #170. At step #170 the terminal P13 is turned "Low" to put the circuit for detecting the charge condition of the main capacitor into operation. After waiting for stabilization of the circuit, judgment is made whether a signal is input from the terminal P14 indicating completion of charging (steps #171 and #172). If the charging is not completed, the program moves to step #201 to eliminate the meter value storing signal from the terminal P17, a signal warning that the exposure control is prohibited because the charging of the main capacitor is not completed is output to the terminal P15, and the program waits for the metering switch S1 to be turned off (steps #202 and #203). When the metering switch S1 is turned off, the program turns off the transistor BT1 to render the circuit AEF inoperative (step #204) whereby no warning is output to the terminal P15 (step #205). Next, step #206 allows an interrupt to take place at the terminal $\overline{IT1}$, step #207 causes a booster operation start signal to be output to the terminal P12, and step #208 waits for a charging completion signal to be input to the terminal P14. When the charging completion signal is input, the transistor BT2 is turned off to render the flash circuit FL inoperative and signals for the booster operation and detecting operation are eliminated from the terminals P12 and P13 (steps #209 to 211). The program then moves to step #60 and the microcomputer MC stops operating.

If step #172 judges that the charging is completed, a signal enabling flashing is output to the terminal P18 and a signal for stopping detection of the charge condition is output to the terminal P13 whereby the detection of the charge condition is stopped (steps #173 and #174). At step #175 whether the release switch S2 is turned on or not is judged. If the switch S2 is off, step #176 judges whether the metering switch S1 is turned on or not. If the metering switch S1 is turned on, the program returns to step #175. Thus, the program waits for the release switch S2 to be turned on while checking if the metering switch S1 is on. If the metering switch S1 is off, the transistors BT1 and BT2 are turned off to eliminate the stored metering values (steps #177 and #178). Then the program returns to step #60 and the microcomputer MC stops operating. If the release switch S2 is judged to be closed at step #175, the program moves to step #180 to cause pulses for the shutter release operation to be output to the terminal P20 to start the exposure control operation. And the terminal P7 transmits imprint starter pulses to the data imprinting circuit DBC (step #181). Subsequently the control circuit AEF carries out the described operation for flash or non-flash photography. The microcomputer MC waits for a signal indicating completion of the exposure control operation to be input at the terminal P21 (step #182). When this signal is input to the terminal P21, step #183 follows to eliminate the meter value storing signal from the terminal P17 and step #184 turns off the transistors BT1 and BT2. At step #185 the film windup subroutine is executed. At steps #186 and #187 judgments are made whether a film is loaded and whether the back lid is closed, respectively. If the film is loaded and the back lid is closed, at step #188 the count of the film counter register FCR is incremented by "1" and at step #189 a film count is indicated, which is followed by step #190. If at steps #186 and #187 it is found that the film is not loaded or the back lid is open, step #190 will follow immediately. At step #190 the microcomputer MC waits for the metering switch S1 to be turned off. When the metering switch S1 is turned off the program moves to step #60 and the microcomputer MC stops operating.

Figure 8A:
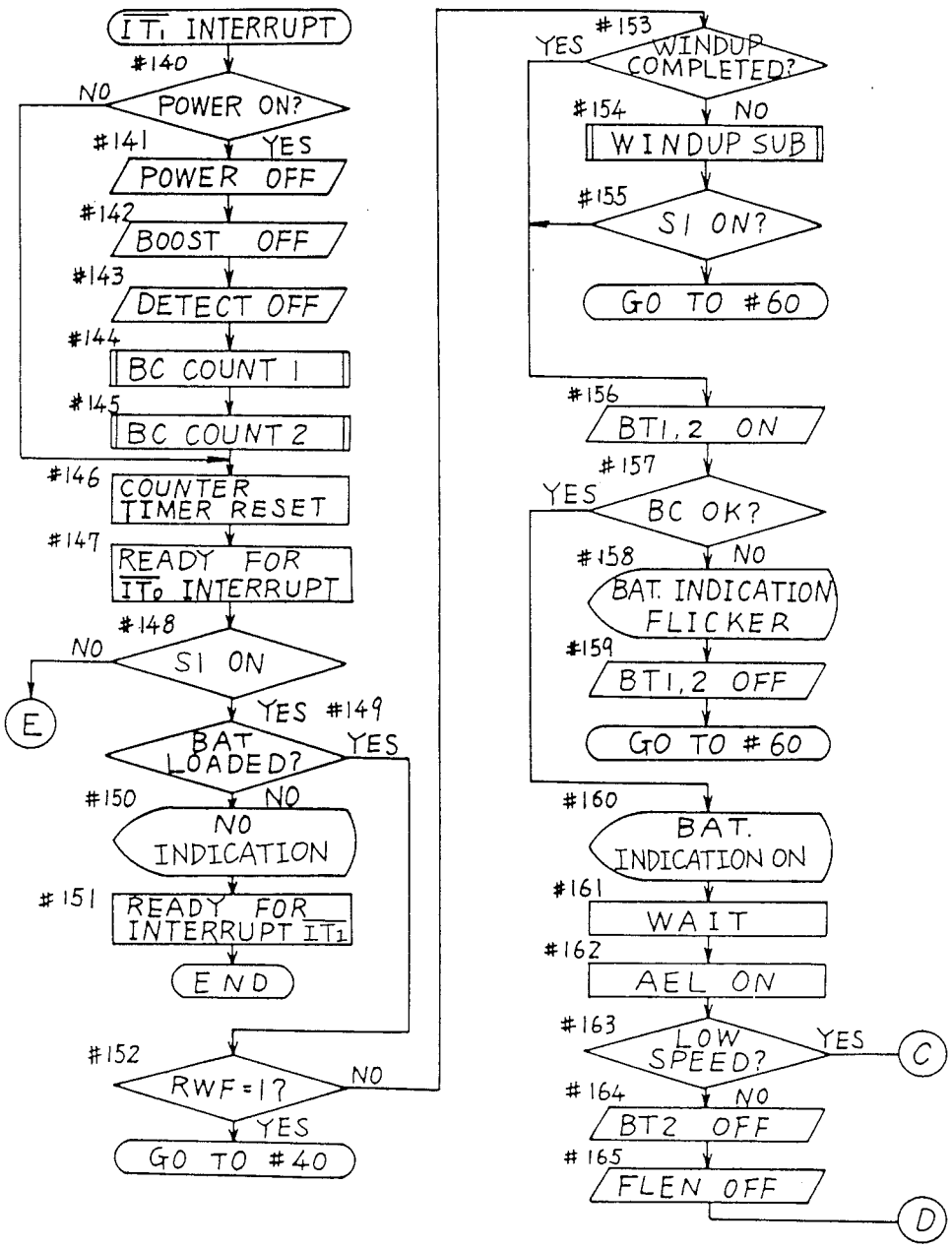
FIGS. 8A, 8B and 9 are interrupt flow charts of the microcomputer in FIG. 1 when a metering switch is turned on and a back lid switch is turned on and off.
Figure 8B:
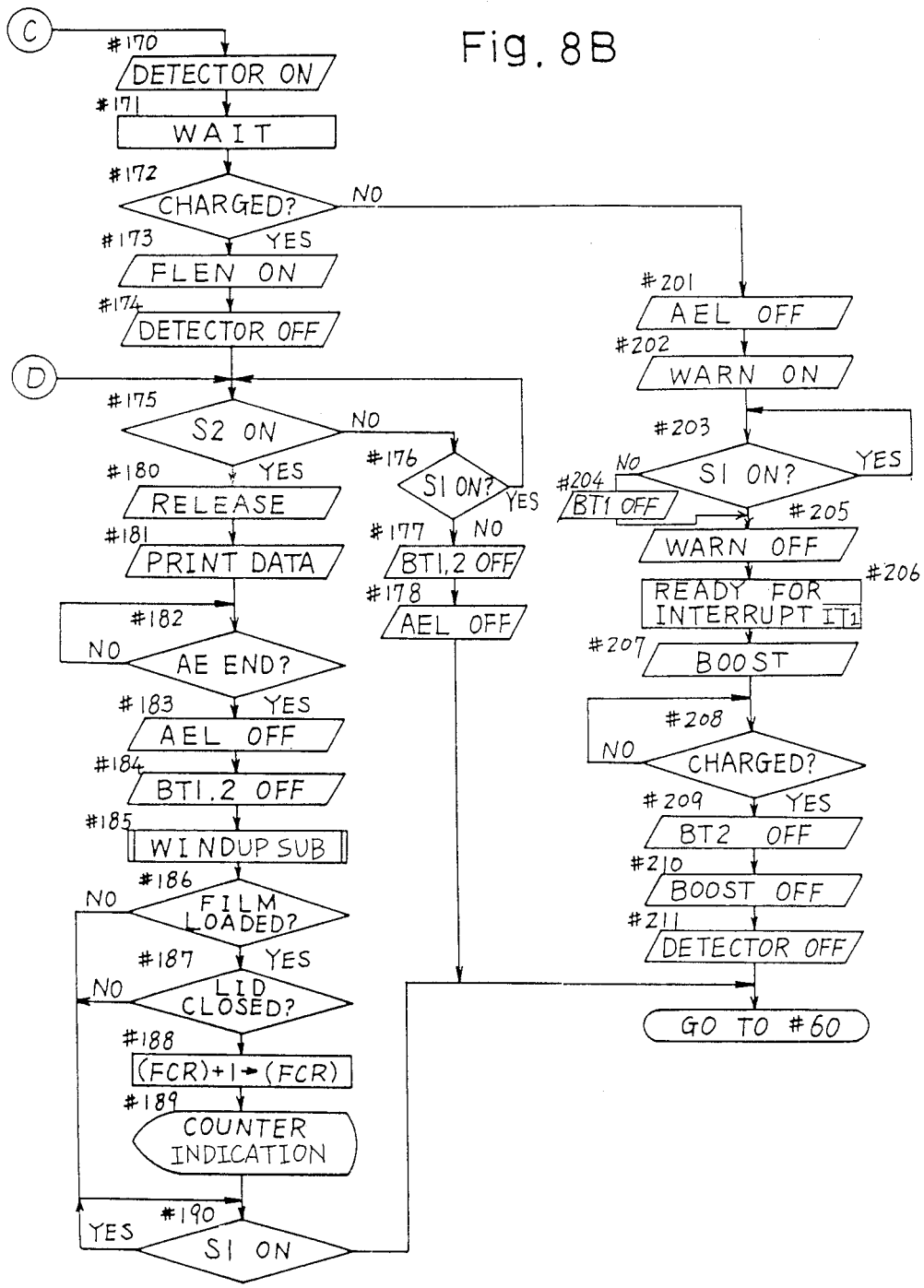
Figure 9:
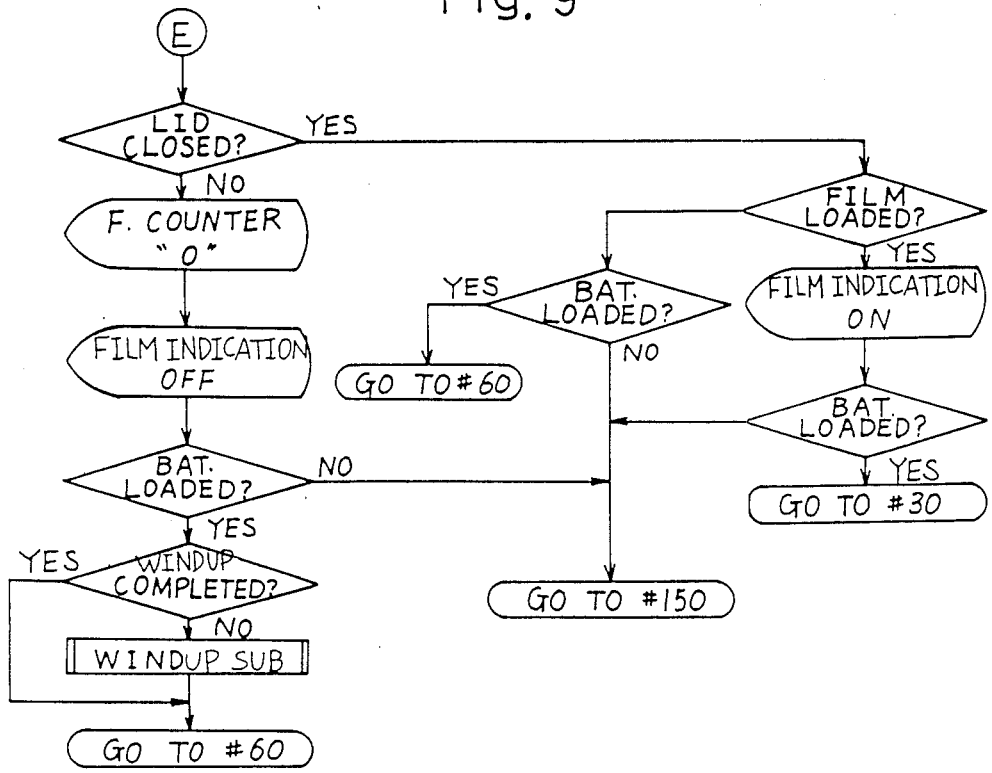

If at step #148 in FIG. 8 it is judged that the metering switch S1 is not closed, it is the case where the back lid is closed or opened and the program moves to step #220. Step #220 judges whether the back lid is closed or opened. If it is opened step #221 will follow, and if it is closed step #230 will follow. At step #221 the count of the film counter register FCR is set to "0" whereby the indicator 24 indicates "0", and then the film load indicator 21 is turned off at step #222. At step #223 judgment is made whether the main battery BBA is loaded or not. If the battery BBA is not loaded, the program moves to step #150 in FIG. 8 to eliminate all indications and enable an interrupt to the terminal $\overline{IT1}$, and the computer stops operating. If at step #223 the main battery BBA is judged to be loaded, the program moves to step #224 to judge whether the film windup is completed or not. If the film windup is completed, the program moves immediately to step #60. If not, the program moves to step #60 after executing the film windup subroutine at step #225. The microcomputer MC then stops operating.

If at step #220 the back lid is judged to be closed, the program moves to step #230 to judge whether a film is loaded or not. If the film is not loaded, step #231 follows to judge whether the main battery BBA is loaded or not. If the main battery BBA is loaded step #60 will follow, and if not step #150 will follow to eliminate all the indications and the microcomputer MC stops operating. On the other hand, if at step #230 the film is judged to be loaded, the program moves to step #232 to give a film load indication 21. At step #233 whether the main battery BBA is loaded or not is judged. If the main battery BBA is not loaded, step #150 will follow to eliminate all the indications and stop the microcomputer MC. If the main battery BBA is loaded, the program returns to step #30 in FIG. 5 to effect the preliminary advance of the film. The microcomputer MC stops operating after going through steps #60 et seq.

FIG. 10 shows a flow chart to be executed when neither the data back battery DBA nor the main battery BBA is loaded and then either one is loaded whereupon the reset signal is input to the terminal $\overline{RES}$. First, step #239 enable an interrupt to take place at the terminal $\overline{IT0}$. Step #240 initializes the output terminals so that the peripheral circuits around the microcomputer MC will not operate. Steps #241 and #242 reset the timer, counter and registors BCR0 to BCR3. Thereafter, in order that the film counter indicates "1" when the film is loaded and the back lid is closed, the register FCR is set to "3" and the register FTR is reset (steps #243 and #244). At step #245 judgment is made whether the rewind switch RWS is turned on. Flag RWF is set to "1" if the rewind switch RWS is turned on and to "0" if not (steps #246 and #247). Step 248 judges whether the battery BBA is loaded or not. If the main battery BBA is not loaded, step #150 follows and the microcomputer MC stops operating. If the main battery BBA is loaded, step #260 will follow.

If the loading of the battery BBA is detected at step #248, the transistor BT3 is made conductive, the motor is braked for the predetermined time, the motor is turned off and the transistor BT3 is turned off (steps #260 to 264). These steps are, like steps #11 to 15 in FIG. 5, for putting the main battery BBA in proper order upon its loading. Subsequently the bar indicators 2 to 6 and the "BATTERY" indicator 1 are turned on (step #265), which is followed by step #266. At steps #266 and #267 judgments are made whether the back lid is closed and whether a film is loaded. If the back lid is closed and the film is loaded, step #268 will follow to turn on the film load indicator 21. AT step #269 whether the rewind flag RWF is at "1" is judged. If the flag RWF is at "1", the register FCR is set to "27H" assuming the number of frames to be 37 and including the preliminary advance so that the film counter 24 will count down from 37, and the program moves to step #40 for the film rewind operation. If at steps #266 and #267 it is judged that the back lid is open or that a film is not loaded, at step #272 the register FCR is set to "0" so that the film counter 24 shows "0", and the film load indicator 21 is turned off which is followed by step #274. Step #274 follows also when the flag RWF is judged to be at "0" at step #269. At step #274 a film count indication is given and thereafter, if the film wind is completed, step 60 will follow immediately and, if the film windup is not completed, the film windup subroutine is executed and then step #60 will follow to stop the microcomputer MC (steps #275 and #276).

While in the described embodiment the judgment as to whether the switch S1 is turned on (step #148 in FIG. 8) is made before the judgement as to loading of the main battery BBA (step #149), this order may be reversed. In this case, if the switch S1 is off, the program jumps to the flow chart of FIG. 9 and steps #223, #231 and #233 for judging whether the main battery BBA is loaded are unnecessary. Furthermore, while in the described embodiment the data back battery DBA for the data imprinting section DB is used also as backup battery for the microcomputer MC, a separate backup battery may be provided for that particular purpose. The data imprinting section DB may be disposed in the main body of the camera. While in the described embodiment the "BATTERY" indicator 1 is flickered when the source voltage of the battery BBA runs low, the residual bar indicators may be flickered instead.

As described above, the present invention provides an electronic instrument wherein a low power consumption one-tip microcomputer and a indicating device receive power supply commonly from a main battery and a backup battery and wherein all the indications by the indicating device are turned off when the main battery is not loaded. The user may readily ascertain from the indicating state of the indicating device whether the main battery is loaded or not, and the indications being turned off constitute a warning that the main battery has been taken out (or a new main battery should be loaded). Therefore, the present invention eliminates the inconveniences encountered heretofore of malfunctioning or breakdown of the instrument which occurs when the user forgets to load the main battery and operates the instrument.

Figure 11:
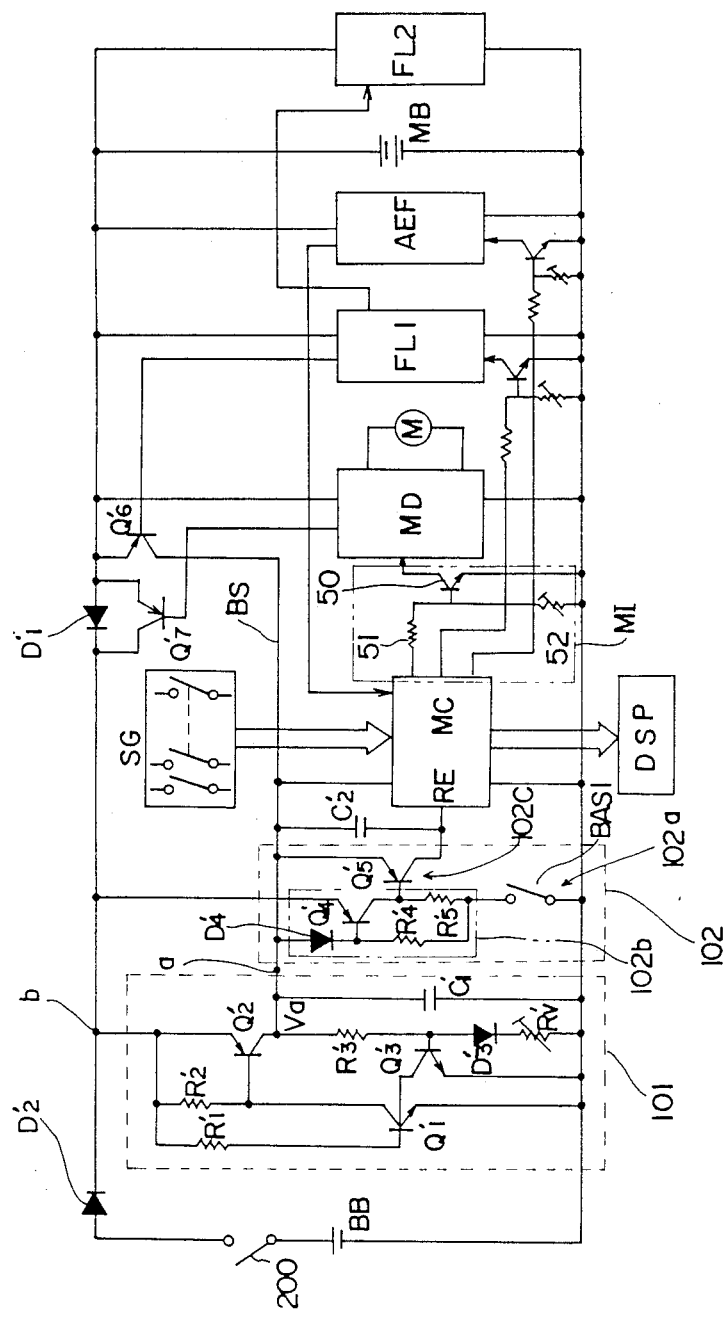
FIG. 11 is a view of an overall circuitry according to a second embodiment of the invention.

FIG. 11 is a circuit diagram of a control system for a camera including power sources according to another embodiment of the present invention. Reference MB denotes a main battery having a 6-volt output voltage, and BB denotes a backup battery having a 3-volt output voltage.

A motor drive circuit MD for driving a motor M to windup and rewind a film, an electronic flash circuit FL2, a boost control circuit FL1 for controlling boost of the flash circuit FL2 and an exposure and focus control circuit AEF for effecting automatic exposure control and automatic focus control are connected to the main battery MB in parallel with one another. When the main battery MB is loaded in the camera, these circuits MD, FL1, FL2 and AEF receive power supply from the main battery MB.

The motor drive circuit MD and boost control circuit FL1 control the motor M and flash circuit FL2 in response to output signals of a microcomputer MC. The exposure and focus control circuit AEF automatically effects exposure and focus control while exchanging data with the microcomputer MC.

The microcomputer MC receives signals from a signal generator SG including switches operatively connected to a shutter release button, a film advance mechanism, a back lid of the camera, switches disposed at a film sensitivity readout device, not shown. A LCD panel DSP is connected to the microcomputer MC for giving indications under direct control of outputs from the microcomputer MC. The indications by the LCD panel DSP include the number of film frames exposed, film sensitivity, exposure control modes, film load conditions and film advance conditions.

The microcomputer MC which is one example of small load circuit receives power supply from the main battery MB or backup battery BB through a stepdown type constant voltage circuit 101. The constant voltage circuit 101 is in parallel connection to the main battery MB and backup battery BB through rectifier diodes D'1 and D'2, respectively. The backup battery BB and the microcomputer MC may be interposed by a power supply switch as described later.

As mentioned hereinbefore, the output voltage of the main battery MB s greater than that of the backup battery BB. Therefore, when the main battery MB is loaded, the microcomputer MC receives power supply only from the main battery MB through the constant voltage circuit 101 by the action of the rectifier diode D'2.

When the main battery MB removably mounted in a main body of the camera, not shown, is taken out for replacement as a result of exhaustion of its battery capacity, the microcomputer MC receives power supply from the backup battery BB through the constant voltage circuit 101. At this time the rectifier diode D'1 acts to forbid power supply from the backup battery BB to the motor drive circuit MD, flash circuit FL2, flash boost control circuit FL1 and exposure and focus control circuit AEF, in order to minimize reduction of the capacity of the backup battery BB. This enables the backup battery BB to operate properly over a relatively long period of time.

The stepdown type constant voltage circuit 101 comprises a current amplifier circuit including two resistors R'1, R'2 and two transistors Q'1, Q'2, and a feedback circuit including a transistor Q'3, a diode D'3, a resistor R'4 and a semifixed resistor R'v.

The semifixed resistor R'v is adjusted such that an output voltage of the constant voltage circuit 101, namely a voltage Va at point a in FIG. 11, which is the source voltage for the microcomputer MC, be a normal operating voltage of the microcomputer MC. A voltage between the base and emitter of the transistor Q'3 is substantially equal in temperature coefficient to a forward voltage of the diode D'3. This assures that the output voltage Va is substantially constant regardless of temperature variations. Reference C'1 denotes a capacitor for restraining variations of the voltage Va at point a in the drawing.

The stepdown type constant voltage circuit 101 maintains the output voltage Va at 1.5 volts at all times despite slight variations of the source voltage.

When, for example, the source voltage (The power source may be the main battery MB or backup battery BB.) drops, the output voltage Va tends to drop and a current flowing through the resistor R'3 also reduces. Therefore, the base current of the transistor Q'3 reduces and so does the collector current of the transistor Q'3. This increases the base current of the transistor Q'1 and the collector current of the transistor Q'1, namely the base current of the transistor Q'2. As a result, the collector current of the transistor Q'2 increases raising the output voltage Va.

Conversely, when the source voltage rises, a reaction opposite to the above will take place and the output voltage Va will drop. Such a feedback action maintains the output voltage of constant voltage circuit 101 at 1.5 volts as regulated by the semifixed resistor R'v.

The constant voltage circuit 101 and microcomputer MC are interposed by a microcomputer drive control circuit 102 for controlling the drive for the microcomputer MC in accordance with the output voltage of the backup battery BB. This microcomputer drive control circuit 102 checks the output voltage of backup battery BB when the main battery MB is removed from the camera, and resets the microcomputer MC if the output voltage of the backup battery BB is below a predetermined voltage.

In other words, the microcomputer MC including its memory is all initialized to avoid malfunctioning of the camera when a new main battery MB is loaded. The malfunctioning would otherwise occur after data in the memory becomes jumbled as a result of the drive by the reduced output voltage of the backup battery BB. If the battery capacity of backup battery BB is sufficient, the resetting of microcomputer MC does not take place and the camera operation is continued after a new main battery MB is loaded, using the data maintained in good order in the memory.

The microcomputer drive control circuit 102 comprises a switch BAS1 acting as a first detector 102a for detecting presence and absence the main battery MB, a backup voltage judging circuit 102b acting as a second detector for detecting the backup voltage and including a diode D'4, a transistor Q'4 and two resistors R'4, R'5, and a transistor Q'5 acting as a resetter 102c.

The switch BAS1 for detecting presence of the main battery MB is opened when the main battery MB is loaded in the camera and is closed when the main battery MB is removed from the camera. In other words, the backup voltage judging circuit 102b is operable when the main battery MB is removed.

The backup voltage judging circuit 102b is operable when the main battery MB is removed as noted above, and causes the transistor Q'5 acting as resetter 102c to be conductive when the output voltage of the backup battery BB is below a predetermined voltage. The transistor Q'5 has a collector connected to a reset terminal RE of the microcomputer MC so that the microcomputer MC is reset when the transistor Q'5 becomes conductive. Reference C'2 in the drawing denotes a capacitor for preventing the microcomputer MC from being inadvertently reset by external noise or the like.

The operation of the backup voltage judging circuit 102b will be described further hereinafter.

The diode D'4 having an anode connected to the output terminal a of the constant voltage circuit 101 has a forward voltage by the resistor R'4 set to be about 250 m volts at normal temperature. The transistor Q'4 having an emitter connected to an input terminal b of the constant voltage circuit 101 has a base-to-emitter voltage by the resistor R'5 set to be about 450 m volts at normal temperature.

In other words, the transistor Q'4 is turned on if a voltage between the input and output terminals a, b of the constant voltage circuit 101 exceeds about 200 m volts, and is turned off if this voltage is below about 200 m volts.

When the transistor Q'4 is turned on, the base voltage of transistor Q'5 is higher than the emitter voltage thereof and the transistor Q'5 is turned off, wherefore the microcomputer MC is not reset. When the transistor Q'4 is turned off, the base voltage of transistor Q'5 is lower than the emitter voltage thereof and the transistor Q'5 is turned on if the difference exceeds the operating voltage, for example 450 m volts, wherefore the microcomputer MC is reset.

The base-to-emitter voltage of transistor Q'5 is substantially equal in temperature coefficient to the forward voltage of the diode D'4. This assures that the microcomputer drive control circuit 102 carries out a substantially constant operation at all times regardless of temperature variations.

The output voltage Va of the constant voltage circuit 101 is 1.5 volts as noted hereinbefore. The output voltage of the backup battery BB normally is neede more than a sum of the above 1.5 volts, 200 m volts which are the collector-to-emitter voltage of transistor Q'2, and 300 m volts which are the forward voltage of diode D'2. That is to say the output voltage of backup battery BB must normally exceed 2.0 volts.

Assume that the output voltage of the backup battery BB has dropped below 2.0 volts, the constant voltage circuit 101 acts to maintain its output voltage Va at 1.5 volts as described hereinbefore, which causes the collector-to-emitter voltage of transistor Q'2 to drop below 200 m volts whereby the microcomputer MC is reset. As a result the data e memory will all be erased.

When the battery capacity of the backup battery BB reduces, the voltage for driving the microcomputer MC does not reach the normal operation voltage and does not ensure proper maintenance of the data stored in the memory. This would cause malfunctioning of the camera when a new main battery MB is loaded therein, such as erroneous indications at the liquid crystal indicator DSP and unnecessary shutter releases. In order to prevent such malfunctions from taking place after the new main battery MB is loaded, the microcomputer MC is reset erasing the data from its memory if the capacity of the backup battery BB is low at times of main battery replacement as described above.

If the backup battery BB has a sufficient capacity at times of main battery replacement, the microcomputer MC is not reset so that the various functions of the camera are perfomed using the data stored in good order in the memory before and after the replacement of the main battery MB. When the capacity of the main battery MB is sufficient and only the capacity of the backup battery BB is low, the microcomputer MC is not reset until the capacity of main battery MB reduces to a level requiring its replacement. Thus, the functions of the camera may continuously be available as long as the capacity of main battery MB remains large enough.

The microcomputer MC receives power supply directly from the main battery MB through a transistor Q'6. This transistor Q'6 which acts as a bypass circuit BS means is switchable on and off by an output signal of the flash boost control circuit FL1. This output signal is in "Low" level keeping the transistor Q'6 turned on during boosting for the flash circuit FL2 to effect flashing, and is in "High" level keeping the transistor Q'6 turned off at other times. When the transistor Q'6 is turned on, the microcomputer MC receives power supply directly from the main battery MB through the bypass circuit BS.

More particularly, it is necessary for the output voltage of the main battery MB to be 2.0 volts, i.e., a sum of 1.3 volts which are a minimum operating voltage for the microcomputer MC, 100 m volts which are a saturation voltage of the transistor Q'2, and 600 m volts which are the forward voltage of the diode D'1. However, power is consumed in a great amount at times of boosting for a flash operation, and a voltage drop occurs due to an internal resistance of the main battery MB If the output voltage of the backup battery BB were less than that of the main battery MB then because of reduction of the capacity of the backup battery BB, power would be supplied from the main battery MB to the microcomputer MC through the diode D'1 and constant voltage circuit 101. The voltage thus supplied would be further reduced by the diode D'1 and transistor Q'2, with the result that the voltage arriving at the microcomputer MC could be below the minimum operating voltage.

Thus, at times of boosting for the flashing operation the transistor Q'6 is turned on to permit the microcomputer MC to receive power supply directly from the main battery MB. This assures that the voltage given to the microcomputer MC will not fall below the minimum operating voltage even if the output voltage of the main battery MB reduces. More particularly, the microcomputer MC is operable properly as long as the output voltage of the main battery MB is equal to or exceeds 1.4 volts, i.e., a sum of 1.3 volts which are the minimum operating voltage of the microcomputer MC and 100 m volts which are the saturation voltage of the transistor Q'6.

The diode D'1 connected in series to the main battery MB is in parallel connection with a transistor Q'7 which is switchable on and off by an output signal of the motor drive circuit MD. The output signal of the motor drive circuit MD is in "Low" level and the transistor Q'7 is turned on at times of driving the motor M. At other times the output signal is in "High" level and the transistor Q'7 is turned off. When the transistor Q'7 is turned on, the microcomputer MC receives power supply from the main battery MB through the constant voltage circuit 101 and not through the diode D'1.

In other words, a large amount of power is consumed for driving the motor M though less than the amount consumed at times of boosting for the flashing operation. Therefore, in order to avoid the voltage given to the microcomputer MC dropping below the minimum operating voltage by minimizing the voltage drop through the power supply route to the microcomputer MC, two ends of the rectifier diode D'1 are short-circuited at times of driving the motor M. More particularly, the microcomputer MC is operable properly as long as the output voltage of the main battery MB is equal to or exceeds 1.5 volts or a sum of 1.3 volts which are the minimum operating voltage of the microcomputer MC and 200 m volts which are the saturation voltages of the two transistors Q'2 and Q'7.

In the described embodiment the microcomputer MC is directly connected to the main battery MB only at times of boosting the flash circuit FL2 for a flashing operation. In addition thereto the same arrangement may be applied to the motor drive circuit MD.

Further, in the described embodiment the microcomputer drive control circuit 102 is operable whenever the main battery MB is removed from the camera. But the time of operation and construction of this main battery MB and the construction of the stepdown type constant voltage circuit 101 may be varied as appropriate, and several examples of variations will be described hereinafter.

Figure 12:
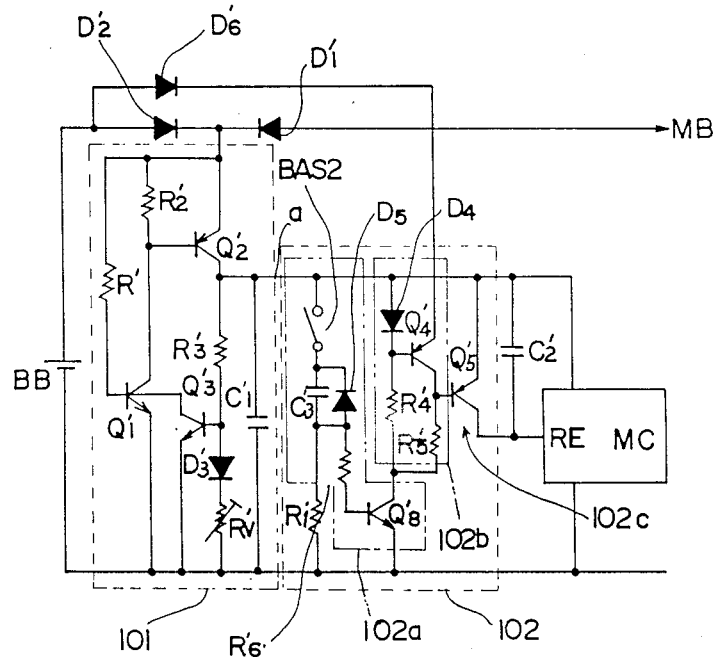
FIG. 12 is a view showing a modified example of power source in the embodiment of FIG. 11.

FIG. 12 shows an example wherein the microcomputer drive control circuit 102 is operable only for a predetermined time after a new main battery MB is loaded. This is based on the fact that the possibility of malfunctioning of the microcomputer MC to hamper or fail actual picture-taking occurs when the new main battery MB is loaded and the varied functions of the camera are resumed according to ill-preserved data in the memory.

In the example of FIG. 12 a transistor Q'8 is provided in place of the switch BAS1 shown in FIG. 11. This transistor Q'8 is kept on for the predetermined time after the main battery MB is loaded, by a switch BAS2 which is closed when the main battery MB is loaded and by a capacity C'3. Thus, the detector 102a for detecting presence of the main battery MB comprises the transistor Q'8, switch BAS2, capacitor C'3 and the two resistors R'6 and R'7.

The state in which the transistor Q'8 is turned on is the same as the state in which the switch BAS1 of FIG. 11 is closed. In this state, by a similar operation to that in the described embodiment, the output voltage of the backup battery BB is detected and the microcomputer MC is reset according to the detection result.

The constant voltage circuit 101, backup voltage judging circuit 102b and resetter 102c are the same as those shown in FIG. 11, and their description will not be repeated. Reference D'5 in FIG. 12 denotes a diode for discharging electric charges accumulated in the capacitor C'3, and reference D'6 denotes a diode for permitting the transistor Q'4 to be turned on and off in a stable manner.

Figure 13:
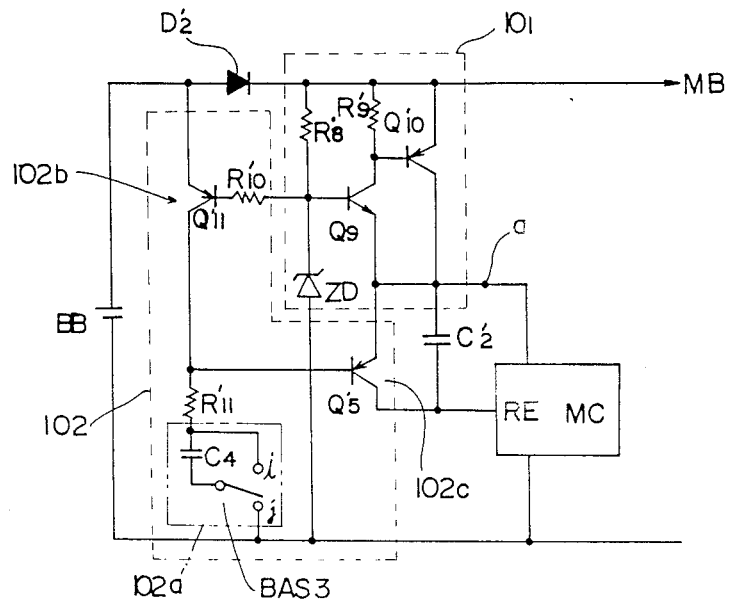
FIG. 13 is a view of a further modified example of power source in the embodiment of FIG. 11.

FIG. 13 shows a further embodiment. In this embodiment the constant voltage circuit 101 comprises a Zener diode ZD, two transistors Q'9, Q'10 and two resistors R'8, R'9. Thus, the output voltage Va of the constant voltage circuit 101 is 1.5 volts as in the foregoing embodiment, and Zener voltage of the Zener diode ZD is a sum of this voltage and the base-to-emitter voltage of the transistor Q'9.

The detector 102a for detecting presence of the main battery MB comprises a switch BAS3 and a capacitor C'4, the switch BAS3 being connected to a first contact i in an upper position in the drawing when the main battery MB is loaded and to a second contact j in a lower position in the drawing when the main battery MB is removed. This detector 102a, a transistor Q'11 acting as backup voltage judging circuit 102b, and the transistor Q'5 acting as resetter 102c constitute the microcomputer drive control circuit 102.

When the capacity of the backup battery BB is sufficient, there is a relatively wide difference between Zener voltage and the output voltage of backup battery BB. In other words, the difference exceeds the base-to-emitter voltage of the transistor Q'11, wherefore this transistor Q'11 is turned on. Accordingly, the base voltage of transistor Q'5 becomes substantially equal to the output voltage of backup battery BB which is higher than the emitter voltage of the transistor Q'5 equal to the output voltage Va of the constant voltage circuit 101, wherefore the transistor Q'5 is turned off. Thus, the microcomputer MC is not reset then.

This state occurs regardless of the position of switch BAS3. In other words, the microcomputer MC is not initialized whether the main battery MB is loaded or not so long as the capacity of backup battery BB is sufficient.

The two ends of the capacitor C'4 is short-circuited to have an equal electric potential when the main battery MB is loaded. Therefore, when the main battery MB is removed and the switch BAS3 is switched into contact with the second contact j, charging of the capacitor C'4 will start. If the capacity of backup battery BB is sufficient at this time, the transistor Q'11 is turned on as described hereinbefore and the capacitor C'4 is charged through the transistor Q'11. And since the transistor Q'5 is turned off at this time, the microcomputer MC is not reset.

If, however, the capacity of backup battery BB is low at this time, the difference between its output voltage and Zener voltage lowers below the operating base-to-emitter voltage, which turns off the transistor Q'11. Therefore, the capacitor C'4 is then charged through the transistor Q'5 and the transistor Q'5 is turned on by an increase of the base current. The base current of the transistor Q'5 occurs until the charging of the capacitor C'4 is completed. After all, therefore, the reset signal is output to the microcomputer MC for the predetermined time after main battery MB is removed.

Figure 14:
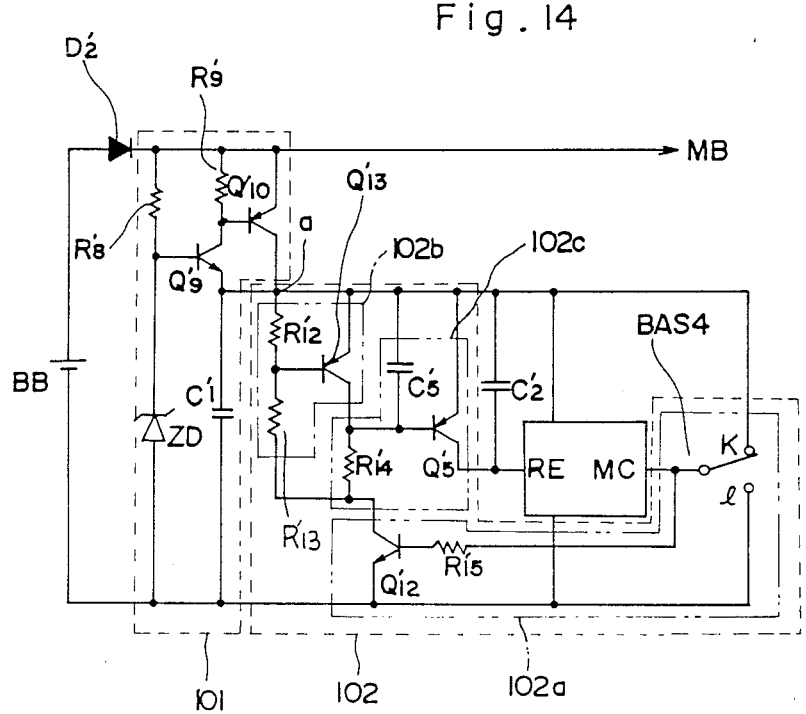
FIG. 14 is a view of a still further modified example of power source in the embodiment of FIG. 11.

FIG. 14 shows a still further example. The constant voltage circuit 101 in this example is the same as that shown in FIG. 13 and therefore will not be described again.

In this example the detector 102a for detecting presence of the main battery MB comprises a switch BAS4, a transistor Q'12 and a resistor R'15, the switch BAS4 being connected to a second contact l in a lower position in the drawing when the main battery MB is loaded and to a first contact k in an upper position in the drawing when the main battery MB is removed. This detector 102a, a transistor Q'13 acting as backup voltage judging circuit 102b, and the transistor Q'5 acting as resetter 102c constitute the microcomputer drive control circuit 102.

Further, in this example a signal indicating the position of switch BAS4 is input to the microcomputer MC. When the switch BAS4 is connected to the first contact k, that is when the main battery MB is removed, operations such as indications at the liquid crystal indicator DSP, though not shown in FIG. 14, are not performed and the only function performed then is preservation of the data stored in the memory by the backup battery BB When the main battery MB is loaded, the switch BAS4 is connected to the second contact l and the transistor Q'12 is turned off. Therefore, since no current occurs between the base and emitter of transistor Q'5 and this transistor Q'5 is turned off, the microcomputer MC is not reset. When the switch BAS4 is connected to the first contact k, the base voltage of transistor Q'12 is raised to a level close to the output voltage of constant voltage circuit 101 and therefore the transistor Q'12 is turned on. In this state the operational condition of the transistor Q'13 changes depending on the capacity of the backup battery BB.

More particularly, resistances of the two resistors R'12 and R'13 are determined so that a voltage exceeding the operating voltage occurs between the base and emitter of transistor Q'13 owing to a voltage drop by the resistor R'12 when the capacity of backup battery BB is sufficient. At this time, therefore, the base voltage of the transistor Q'5 is raised to a level close to the output voltage Va of the constant voltage circuit 101. This turns off the transistor Q'5, and the microcomputer MC is not reset.

If the capacity of the backup battery BB is so low that the output voltage Va of the constant voltage circuit 101 is below the minimum operating voltage of the microcomputer MC, the voltage drop by the resistance R'12 does not result in the voltage between the base and emitter of transistor Q'13 reaching the operating voltage. Therefore the transistor Q'13 is turned off at this time.

Consequently, the capacitor C'5 is then charged and, when the difference in electric potential between the two ends of the capacitor C'5, that is the voltage between the base and emitter of transistor Q'5, reaches the operating voltage, the transistor Q'5 is turned on and the microcomputer MC is reset. The capacitor C'5 acts also to prevent the transistor Q'5 from being turned on by external noise.

The described electric source device for a camera checks whether the backup battery still has a capacity or not when the main battery has been exhausted and is replaced with a new main battery. The microcomputer is initialized if the output voltage of the backup battery is below a predetermined value. This is effective to prevent malfunctioning of the camera due to jumbling of the data stored in the memory which is caused by a reduced capacity of the backup battery Moreover, since the microcomputer is no initialized when only one of the batteries is exhausted, but can continue operating properly by means of the other battery. This permits the camera to take pictures efficiently avoiding unnecessary initialization of the microcomputer and stopping of the camera operation.

Furthermore, the microcomputer receives power supply through a bypass circuit when a great-load circuit such as the flash circuit is in operation and through a stepdown circuit when the great-load circuit is out of operation. This arrangement is effective to maintai the voltage supplied to the microcomputer equal to or above the minimum operating voltage of the microcomputer even when a voltage drop occurs by the operation of the great-load circuit.

The arrangement for transmitting a stable voltage from the main battery to the microcomputer basically comprises a power supply switching device including the stepdown circuit, the bypass circuit and a switching element which are simple in construction. This permits the camera to be compact and low cost.

The power supply switch 200 provided between the backup battery BB and the microcomputer MC which has not been described with reference to FIG. 11 but which provides a great advantage will be described next with reference to FIGS. 15 through 18. When closed this switch 200 permits power to be supplied from the backup battery BB to the microcomputer MC. The switch 200 is closed upon initial loading of the main battery MB and remains closed thereafter.

In other words, the backup battery BB is loaded in the camera when the camera is shipped from a factory. The main battery MB is loaded by the user when the camera is used. The motor drive circuit MD, the flash circuit FL2, the LCD panel DSP, and control circuits AEF and FL1 do not come into operation until the main battery MB is loaded and actual picture-taking is started. Until then, therefore, it is unnecessary to control their operation, store photographic data and indicate the data. In order to prevent wasteful power consumption of the backup battery BB the power supply from the backup battery BB to the microcomputer MC is forbidden until the main battery MB is loaded for the first time.

Once the power supply from the backup battery BB to the microcomputer MC is started this state is maintained thereafter. Therefore, the data stored in the memory of the microcomputer MC will never be erased and picture-taking may be continued.

The power supply switch 200 has a construction described hereinafter.

Referring to FIG. 15, a battery chamber BR for housing the main battery MB is provided with a switch operating section SO including a switch operating element 203. The switch operating element 203 defines an inclined portion 203a at an end thereof opposed to the battery chamber BR, and a projection 203b at the other end thereof opposed to the power supply switch 200 comprising a microswitch mounted in a deep end of the switch operating section SO.

The switch operating section SO further includes a spring 204 attached to the switch operating element 203 to extend outwardly. When the camera is shipped from a factory, a projecting portion 204a of the spring 204 is in engagement with a first engagement portion 205a defined in a peripheral wall of the switch operating section SO. In this state the inclined portion 203a projects into the battery chamber BR and the power supply switch 200 remains open.

As the main battery MB is loaded, its shoulder K1 comes into contact with the inclined portion 203a of the switch operating element 203 as shown. As the main battery MB advances further into the battery chamber BR, the inclined portion 203a is pushed and the switch operating element 203 moves rightward in the drawing.

Then the projecting portion 204a of the spring 204 disengages from the first engagement portion 205a. When a plus terminal P of the main battery MB abuts against a terminal T of the battery chamber BR, the inclined portion 203a is retracted from the battery chamber BR and the projecting portion 204a of spring 204 engages a second engagement portion 205b located farther away from the battery chamber BR than the first engagement portion 205a. In this position the projection 203b of the switch operating element 203 contacts and closes the power supply switch 200.

This starts the power supply from the backup battery BB to the microcomputer MC including its memory as described hereinbefore Thereafter the projecting portion 204a of spring 204 remains in engagement with the second engagement portion 205b keeping the power supply switch 200 closed even when the main battery MB is taken out of the battery chamber BR for replacement. That is to say the power supply for the microcomputer MC is continued.

The battery chamber BR is further provided with a main battery detector switch BAS comprising a microswitch and constituting part of the first detecting means.

The switch BAS is closed when the main battery MB is loaded with its shoulder K2 contacting one of the lips 206a of the switch BAS. When the main battery MB is removed from the battery chamber BR, the switch BAS is opened by virtue of a resilient restoring force of the lip 206a which is formed of spring steel.

The circuits are checked at the factory prior to shipment, and this checking is carried out without closing the power supply switch 200 by using a power source having a special shape that does not include the shoulders K.

Another example of power supply switch 200 will be described next.

Referring to FIGS. 16A and 16B, the switch operating section SO comprises two operator arms 207 and 208. The first operator arm 207 is mounted to be pivotable on an axis P1 and is urged by a spring 209 in the counterclockwise direction in the drawings. At the time of shipment the arm 207 is maintained in a position as shown in FIG. 16A, resting on an engagement portion 211 defined in a peripheral wall of the battery chamber BR with a free end 207a thereof projecting into the battery chamber BR.

The second operator arm 208 is mounted to be pivotable on an axis P2 and is urged by a spring 210 in the clockwise direction in the drawings. At the time of shipment the arm 208 is maintained in a position shown in FIG. 16A, with a free end 208a thereof engaged by an end 207b of the first operator arm 207 at which the second arm 208 is urged.

As the main battery MB is loaded into the battery chamber BR, the shoulder K of the main battery MB contacts and pushes the free end 207a of the first operator arm 207 upwardly in the drawings By this the other end 207b of the first operator arm 207 is lowered thereby releasing the free end 208a of the second operator arm 208.

Therefore, as shown in FIG. 16B the second operator arm 208 pivots clockwise about the axis P2 under the urging force of the spring 210, and the free end 208a closes the power supply switch 200 comprises a microswitch. At the same time the clockwise pivoting of the first operator arm 207 causes the end 207b to contact one of the lips 206b of the main battery detector switch BAS and close the switch BAS.

When the main battery MB is removed from the battery chamber BR for replacement, the free end 207a of the first operator arm 207 is released from the contact by the shoulder K of the main battery MB. The first operator arm 207 then pivots counterclockwise under the urging force of the spring 209 until the free end 207a contacts the engagement portion 211 of the battery chamber BR. In this position the detector switch BAS is opened by virtue of the resilient restoring force of the lip 206b, but the power supply switch 200 remains closed since the free end 208a of the second operator arm 208 will not be engaged by the end 207b of the first operator arm 207 again.

The circuit checking with this example is carried out at the factory prior to shipment by using a power source having a special shape as in the preceding example. In the case of circuit arrangement as shown in FIG. 11, the input terminal of the constant voltage circuit 101 is connected to a separate power source by means of a terminal, not shown. This terminal is covered by a nameplate or other member prior to the shipment.

The power supply switch 200 may be electrically operable when the main battery MB is loaded instead of being mechanically operable as are the foregoing two examples. Electrically operable examples will be described hereinafter.

Figure 17:
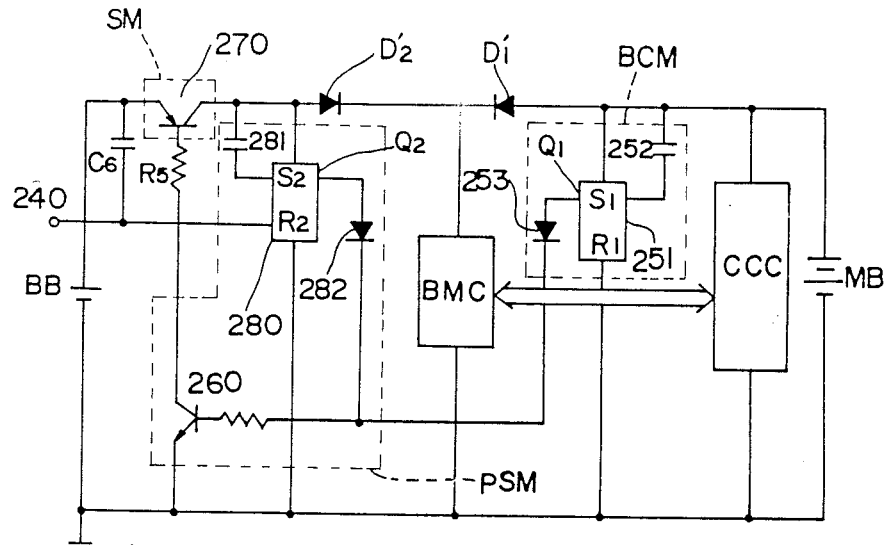
FIG. 17 is a view of a circuitry according to a third embodiment of the invention.

FIG. 17 shows a circuitry including a camera control circuit CCC which is a combination of the motor drive circuit, the microcomputer and other circuits, and a memory circuit BMC which is one example of memory means corresponding to the memory of the microcomputer provided independently thereof. The camera control circuit CCC and memory circuit BMC are connected to the main battery MB having a 6-volt output and backup battery BB having a 3-volt output in parallel to each other. The circuitry further includes diodes D'1 and D'2 mounted between the memory circuit BMC and the main battery MB and between the memory circuit BMC and the backup battery BB, respectively, to forbid power supply from the main battery MB to the backup battery BB and vice versa.

When the main battery MB is loaded, the camera control circuit CCC receives power supply directly from the main battery MB. The memory circuit BMC receives power supply by the action of diode D'1 from the main battery MB having the greater power output when the latter is loaded, and from the backup battery BB through the diode D'2 when the main battery MB is taken out for replacement or the capacity of main battery MB has consumed.

According to this circuit arrangement, however, the memory circuit BMC does not receive the power supply from the backup battery BB when the main battery MB has never been loaded before.

More particularly, the circuitry includes a first flip-flop 251 connected parallel to the main battery MB and having an output terminal Q1 whose output signal is in "Low" level in the initial state. This output signal is input to the base of a transistor 260 and no operating voltage occurs between the base and emitter of this transistor 260, wherefore the transistor 260 is kept off. Since no current occurs between the collector and emitter of the transistor 260, no current occurs between the base and emitter of a transistor 270 mounted on a power supply route from the backup battery BB to the memory circuit BMC and therefore this transistor 270 too is kept off. In other words, the power supply from the backup battery BB to the memory circuit BMC is forbidden.

When the main battery MB is loaded in this state, a capacitor 252 mounted between the main battery MB and a set input terminal S1 of the first flip-flop 251 turns an input signal to the set input terminal S1 to "High" level. This sets the first flip-flop1 turning the output signal of its output terminal Q1 to "High" level. Therefore, electric potential of the base of transistor 260 to which this output signal is input through the diode 253 is raised to turn on the transistor 260. And a current occurs between the base and emitter of the transistor 270 which turns on the transistor 270.

As a result, conditions are established to enable the power supply from the backup battery BB to memory circuit BMC. When in this state the main battery MB is taken out or its capacity reduces, the power supply from the backup battery BB to memory circuit BMC will be started.

Once the transistor 270 is turned on and the conditions are established for enabling the power supply from the backup battery BB to memory circuit BMC, a capacitor 281 mounted between the backup battery BB and a set input terminal S2 of a second flip-flop 280 is charged turning an input signal to the set input terminal S2 to "High" level This sets the second flip-flop 280 and turns an output signal from its output terminal Q2 to "High" level. Therefore, electric potential of the base of the transistor 260 to which this output signal is input through a diode 282 is raised, and the transistor 260 maintains itself in the "on" state.

In other words, the first flip-flop 251, capacitor 252 and diode 253 constitute a detector BCM for detecting presence of the main battery MB. The transistor 270 acts as switch SM having the function of the foregoing power supply switch 200. The transistor 260, the second flip-flop 280, capacitor 281 and diode 282 constitute a power supply starter PSM operable, when the main battery MB is loaded, to turn on the switch SM and keeps it on thereafter.

Circuit checking is carried out on this embodiment at a factory prior to shipment, with both the main battery MB and backup battery BB loaded At this time the second flip-flop 280 remains set after the checking, and is reset after the main battery MB is removed by equalizing electric potential of a terminal 240 connected to the reset terminal R2 of the flip-flop 280 to that of the backup battery BB.

This eliminates the self-maintenance function to continue power supply from the backup battery BB. At the time of shipment from the factory, this terminal 240 is covered by a nameplate or other member, not shown, so that the flip-flop 280 will not be inadvertently reset thereafter.

Figure 18:
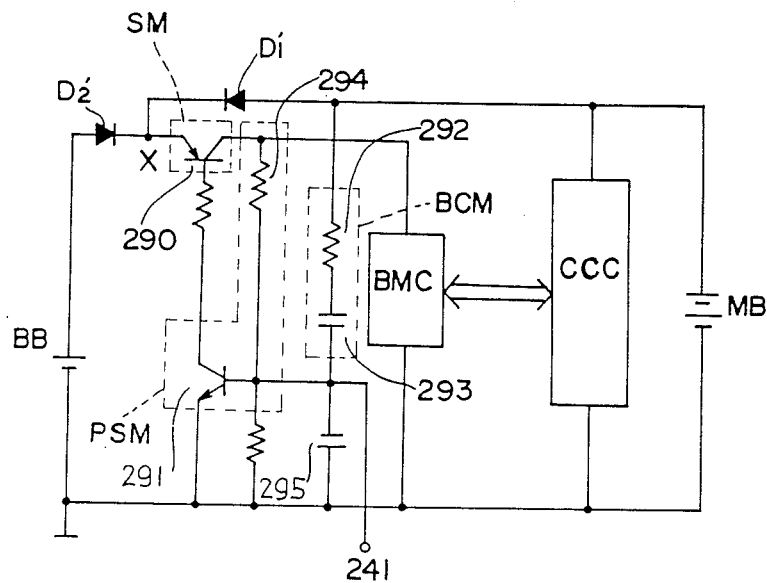
FIG. 18 is a view of a circuitry according to a fourth embodiment of the invention.

Another example shown in FIG. 18 will be described next

In this circuitry, as in the circuitry of FIG. 17, the camera control circuit CCC and memory circuit BMC are connected in parallel with each other to the main battery MB having a 6-volt output voltage and the backup battery BB having a 3-volt output voltage Rectifier diodes D'1 and D'2 are mounted between the memory circuit BMC and the main battery MB and between the memory circuit BMC and backup battery BB, respectively.

When the main battery MB is loaded, the camera control circuit CCC receives power supply directly from the main battery MB. The memory circuit BMC receives power supply by the action of diode D'1 from the main battery MB having the greater power output when the latter is loaded, and from the backup battery BB when the main battery MB is taken out for replacement or the capacity of main battery MB has reduced.

In this circuit arrangement also, the memory circuit BMC does not receive the power supply from the backup battery BB when the main battery MB has never been loaded before More particularly, the circuitry includes a transistor 291 whose base is substantially grounded and the transistor 291 is turned off in the initial state. Therefore, no current occurs between the base and emitter of a transistor 290 mounted on a power supply route from the backup battery BB to memory circuit BMC and therefore this transistor 290 too is kept off. In other words, the power supply from the backup battery BB to the memory circuit BMC is forbidden.

When the main battery MB is loaded in this state, a resistor 292 an a capacity 293 connected parallel to the main battery MB raise electric potential of the base of transistor 291. This turns on the transistor 291 generating a current between the collector and emitter thereof and a current between the base and emitter of transistor 290 whereby the transistor 290 is turned on. As a result, the power supply route is established extending from a junction between the two rectifier diodes D'1 and D'2 to the memory circuit BMC.

Once this power supply route is established, current is constantly supplied to the base of transistor 291 through resistor 294. Therefore, the transistor 291 is in the "on" state constantly and the transistor 290 is turned on and the transistor 290 maintains itself in the "on" state.

Then the main battery MB starts supplying power to the memory circuit BMC. When the main battery MB is taken out or its capacity has reduced, power is supplied from the backup battery BB to the memory circuit BMC.

In other words, the resistor 292 and capacity 293 constitute the detector BCM for detecting presence of the main battery MB. The transistor 290 acts as switch SM having the function of the foregoing power supply switch 200 and the transistor 270 of FIG. 17. The transistor 291 and resistor 294 constitute the power supply starter PSM operable, when the main battery MB is loaded, to turn on the switch SM and keeps it on thereafter.

Circuit checking is carried out on this embodiment at a factory prior to shipment, with both the main battery MB and backup battery BB loaded as in the preceding example. At this time the transistor 291 remains in the "on" state after the checking, and is initialized after the main battery MB is removed by grounding a terminal 241 connected to the base of the transistor 291.

This eliminates the self-maintenance function to continue power supply from the backup battery BB. At the time of shipment from the factory, this terminal 241 is covered by a nameplate or other member, not shown, so that the transistor 291 will not be inadvertently initialized thereafter.

Numeral 295 denotes a capacitor for preventing the transistors 290 and 291 from being turned on by external noise or other obstructions.

As will be clear from the several examples so far described, the construction for forbidding the power supply from the backup battery BB to the memory device BMC until the main battery MB is loaded for the first time may be mechanically operable or electrically operable. Its specific construction may also be varied as appropriate.

In the embodiment of FIG. 15, the switch operating element 203 constitutes the battery detector BCM, the power supply switch 200 constitutes the switch SM, and the spring 204 and two engagement portions 205a, 205b in combination constitute the power supply starter PSM. In the embodiment of FIGS. 16A and 16B the first operator arm 207 constitutes the battery detector BCM, the power supply switch 200 constitutes the switch SM, and the second operator arm 208 having the predetermined positional relationship with the first arm 207 and the spring 210 in combination constitute the power supply starter PSM.

An arrangement for forbidding operation of operating units such as the motor drive circuit MD, and control circuits AEF and FL1 when the capacity of the backup battery BB has reduced, will be described hereinafter with reference to FIGS. 11, 19 and 20. The parts of the arrangement already described with reference to FIG. 11 will not be repeated.

The description will be given taking for example means for forbidding the operation of motor drive circuit MD when the capacity of the backup battery BB has reduced. A base voltage of a transistor 50 in FIG. 11 corresponds to the output voltage Va of the constant voltage circuit 101 divided by a resistor 51 and a semifixed resistor 52. Therefore, by adjusting the semifixed resistor 52, a fractional voltage as made below an operating voltage of this transistor 50 when the output voltage of the constant voltage circuit 101 is below the normal operating voltage of the microcomputer MC.

To describe this further, the normal operating voltage is not applied to the microcomputer MC and the data stored in the memory may not be maintained in good order when the backup battery BB is not loaded or its capacity has reduced. In this case, malfunctioning of the motor drive circuit MD or other trouble may arise because of ill-maintained data.

For example, an effort to windup the film may be exerted when the film windup has already been completed, which may result in such trouble as film breakage or damage to the film windup mechanism.

In order to avoid such trouble, the motor drive circuit MD is prevented from operating when the voltage applied to the microcomputer MC is below the normal operating voltage.

More particularly, the transistor 50, resistor 51, and semifixed resistor 52 constitute an operation restrictor for forbidding operation of the motor drive circuit MD when the output voltage of the backup battery BB is below the predetermined voltage.

In order to compensate for the temperature characteristics of the microcomputer MC, the semifixed resistance 52 may be replaced by a temperature sensitive resistance element or the resistor 51 may be replaced by a semifixed resistor.

This circuit permits the microcomputer MC to operate when only the backup battery BB is loaded. However, it is unnecessary to operate the microcomputer MC or display the data when the main battery MB is not loaded.

In this case, checking is made of the main battery detector switch BAS1 which is operable with loading and unloading of the main battery MB. When the main battery is not loaded, power is supplied from the backup battery BB only to preserve the data in the memory without operating the microcomputer MC and without giving any indications. This minimizes reduction in the capacity of the backup battery BB.

Figure 19:
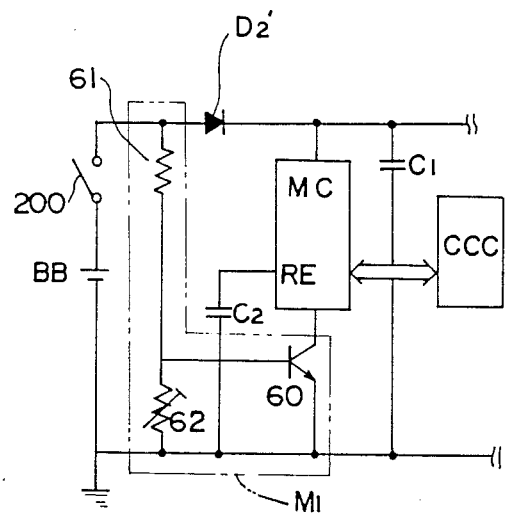
FIG. 19 is a circuit diagram of a modified power source arrangement.
Figure 20:
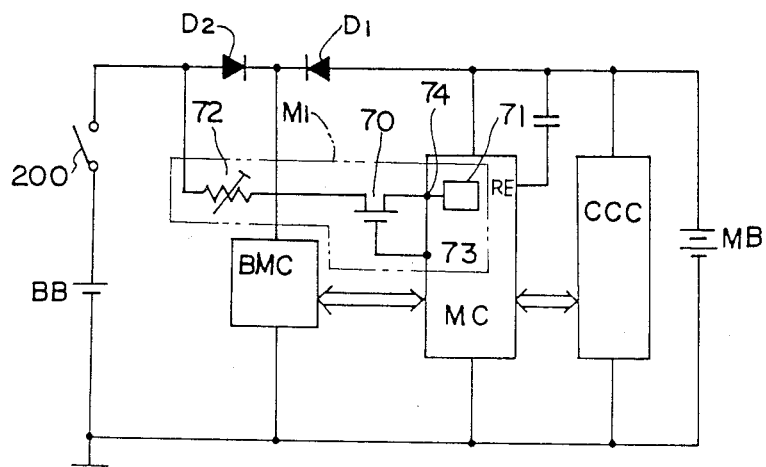
FIG. 20 is a view of a circuitry according to a fifth embodiment of the invention.

FIGS. 19 and 20 show further examples of arrangement for forbidding the operation of the operating unit when the capacity of the backup battery BB has reduced.

The cirucitry of FIG. 19 includes the camera control circuit CCC described with reference to FIG. 11 which is one example of operating unit comprising a combination of the motor drive circuit MD and other cirucits, and the microcomputer MC comprising a memory which is one example of data storying device The camera control circuit CCC and the microcomputer MC are connected in parallel with each other to the main battery MB having a 6-volt output voltage and the backup battery BB having a 3-volt output voltage.

When the main battery MB is loaded, the camera control circuit CCC receives power supply directly from the main battery MB.

The circuitry further includes a rectifier diode D2' between the microcomputer MC and the backup battery BB. In other words, by the action of diode D2' the microcomputer MC receives power supply from the main battery MB having the greater output voltage, and from the backup battery BB when the main battery MB is taken out for replacement or its capacity has reduced.

A resistor 61 and a semifixed resistor 62 are connected in series to the backup battery BB, and a junction between the two resistors 61, 62 is connected to the base of a transistor 60. The transistor 60 is mounted on the power supply route to the microcomputer MC to permit the power to be supplied to the microcomputer MC only when it is turned on.

The semifixed resistor 62 is adjusted so that, when the output voltage of the backup battery BB is equal to or exceeds the minimum operating voltage of the microcomputer MC, an operating voltage occurs between the base and emitter of the transistor 60 to turn on the transistor 60. Therefore, when the capacity of the backup battery BB is sufficient, the transistor 60 is turned on establishing the power supply route to the microcomputer MC. In this state the microcomputer MC receives power supply from the main battery MB or backup battery BB.

When the output voltage of the backup battery BB reduces below the minimum operating voltage of the microcomputer MC, the voltage between the base and emitter of the transistor 60 falls below the operating voltage turning off the transistor 60. Therefore, power supply to the microcomputer MC is forbidden. As a result, the camera control circuit CCC operable under control by the microcomputer MC becomes inoperative.

In order to compensate for the temperature characteristics of the microcomputer MC, the semifixed resistor 61 may be replaced by a temperature sensitive resistance element and the resistor 61 may be replaced by a semifixed resistor.

More particularly, in this circuitry the transistor 60, resistor 61 and semifixed resistor 62 constitute an operation restrictor MI for forbidding operation of the camera control circuit CCC when the output voltage of the backup battery BB is below the predetermined voltage.

Detecting means, such as a switch 200', is provided for outputting signals indicating the presence and absence of backup battery BB. Switch 200' is similar to switch BAS, i.e., closed when backup battery BB is attached and open when backup battery BB is removed.

The circuitry of FIG. 20 includes the camera control circuit CCC, microcomputer MC, and memory circuit BMC which is one example of data storing device provided independently of the microcomputer MC, are connected in parallel with one another to a main battery MB and a backup battery BB both having a 3-volt output voltage. The circuitry further includes diodes D1' and D2' mounted between the memory circuit BMC and the main battery MB and between the memory circuit BMC and the backup battery BB, to forbid power supply from the main battery MB to the backup battery BB, and vice versa.

Upon starting of the microcomputer MC, its output terminal 73 outputs a signal to establish conductivity between the drain and source of an FET 70 connected through a semifixed resistor 72 to a point between the backup battery BB and the microcomputer MC. The microcomputer MC includes a voltage detector circuit 71 for checking whether or not the voltage input to an input terminal 74 of the microcomputer MC through the FET 70, namely the output voltage of the backup battery BB, is equal to or above a predetermined voltage.

If this voltage is equal to or above the predetermined voltage, i.e., the minimum operating voltage of the microcomputer MC, the microcomputer MC continues its operation. The microcomputer MC stops its operation if this voltage is below the minimum operating voltage, that is if the backup battery BB is not loaded or its capacity has reduced.

As a result, the camera control circuit which is operable under control by the microcomputer MC becomes inoperative.

More particularly, in this circuitry the FET 70, semifixed resistor 72, the two terminals 73, 74 of the microcomputer MC and the voltage detector circuit 71 contained in the microcomputer MC constitute an operation restrictor MI for forbidding operation of the camera control circuit CCC when the output voltage of the backup battery BB is below the predetermined voltage.

The combination of the transistor 50 and resistor 51 and 52 in FIG. 11, and the combination of the transistor 60 and resistors 61 and 62 in FIG. 19 may be a C-MOS type comparator or a two-input comparator adapted to receive a reference voltage at one of the input terminals.

As will be clear from the several examples described above, the specific construction of the operation restrictor MI may be varied as appropriate according to the circuit arrangement of the camera.

Figure 21:
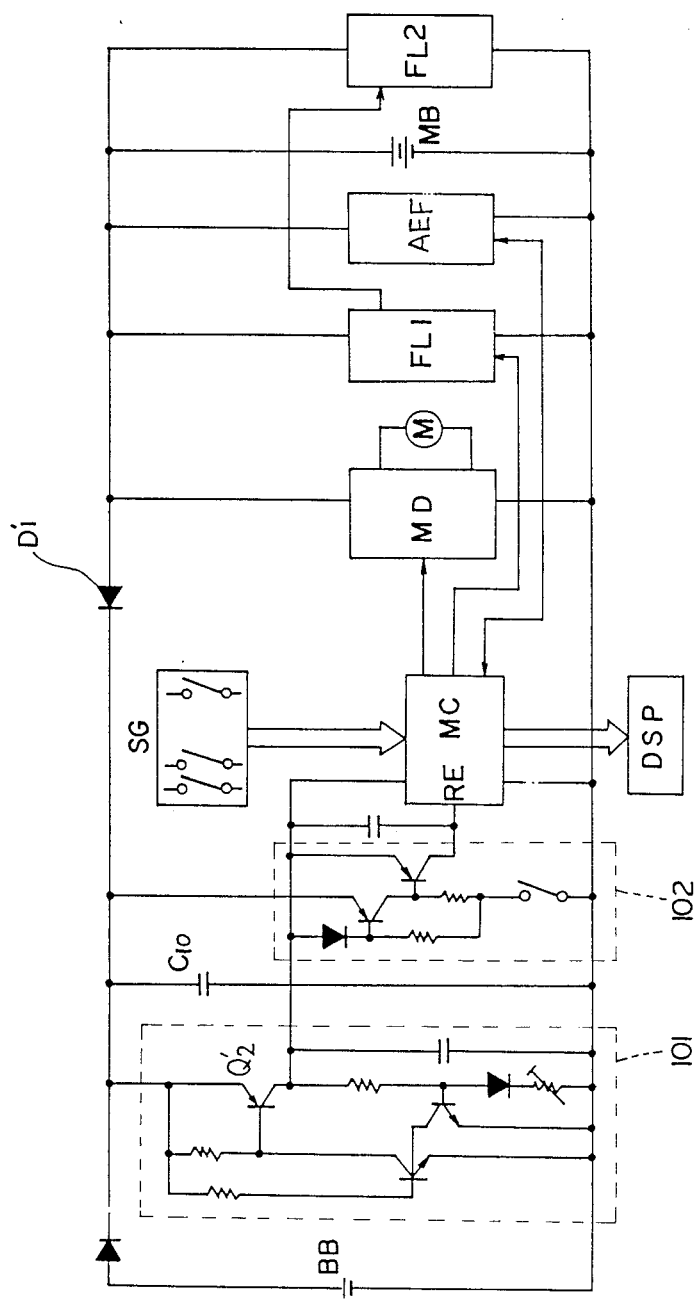
FIG. 21 is a view of an overall circuitry according to a sixth embodiment of the invention.

FIG. 21 shows a modification of the control system of a camera including power sources shown in FIG. 11. This modification has a principal feature in a capacitor C'10 acting as charge means connected in parallel to the input terminal of the constant voltage circuit 101. This capacity C'10 is for permitting the microcomputer MC to continue its operation for a certain period of time by discharging electric charges in its store when a voltage drop occurs with drive of the motor M or operation of the flash circuit FL2 or when the output voltage of the main battery MB reduces due to consumption of its battery capacity and the battery capacity of the backup battery BB which supplies power to the microcomputer MC in that state has also reduced.

At the time of discharge from the capacitor C'10, the diode D'1 acting as rectifying element forbids power supply to the main battery MB and therefore power is supplied to the microcomputer MC without waste.

By connecting the capacitor C10' in parallel to the input terminal of the stepdown type constant voltage circuit 101, the charge voltage is raised almost to the level of output voltage of the main battery MB. Because of a relatively wide difference between the high charge voltage and the minimum operating voltage of the microcomputer MC, the microcomputer MC is driven for a long period of time. This permits the capacitor C'10 to have a relatively small capacity which contributes toward compactness and low cost of the entire camera.

To be more particular, the main battery MB has a 6-volt output voltage and the rectifier diode D'1 has a 0.6 volt forward voltage, and therefore the charge voltage of the capacitor C'10 is 5.4 volts. Assuming that the minimum operating voltage of the microcomputer MC is 1.3 volts and its current consumption is 10 A, the saturation voltage of the transistor Q'2 of the constant voltage circuit 101 is 0.1 volts and its current consumption is 2 A, and the boosting time for a flashing operation which may lower the output voltage of the main battery MB is 20 seconds, the capacity C of the capacitor C'10 necessary for the proper operation of the microcomputer MC is derived from the following equation:

$$C = \{10 \mu A + 2 \mu A) \times 20 \ sec.\}/\{5.4 \ V - (1.3 \ V + 0.1 \ V)\} + 60$$

In conventional practice, generally a capacitor or other device is directly connected in parallel to the microcomputer MC. For comparison purposes, the capacity C' of the capacitor in this instance is, assuming that the output voltage of the constant voltage circuit 101 is 1.5 volts;

$$C' = (10 \mu A \times 20 \ sec.)/(1.5 \ V - 1.3 \ V) = 1,000 \ \mu F \qquad (2)$$

By comparing the two equations it will be clear that the power supply circuitry according to the present invention can manage with a small capacity capacitor.

While in the foregoing example the power sources comprise the main battery MB and backup battery BB connected in parallel, this example may be worked without the backup battery BB.

In working the present invention, the power supply route may be switchable so that the power may be supplied from the capacitor C'10 directly to the microcomputer MC bypassing the constant voltage circuit 101 when the output voltage of the main battery MB has reduced and the discharge from the capacitor C'10 takes plane. The capacitor C'10 in the foregoing example may be replaced by a rechargeable battery or a secondary battery to act as the charging device.

The described power supply circuitry comprises a charging device mounted between the stepdown circuit and the source battery and a rectifying element between the charging device and the source battery for forbidding power supply from the charging device to the source battery. By the action of the rectifying element the power supplies from the charging device is directed exclusively so the load circuit, and therefore power supply to the load circuit is effected in a wasteless manner. The voltage charged into the charging device becomes substantially equal to the output voltage of the source battery and sufficiently different from the minimum operating voltage of the load circuit Therefore, by supplying power over a long period of time the load circuit is capable of operation after the output voltage of the source battery has reduced, and yet the charging device may have a small capacity which promotes compactness and low cost of the camera.

What is claimed is:

1. An electronic instrument including operating units, comprising:
   microcomputer means for controlling operation of each unit of the instrument;
   display means for indicating control states of the operating units
   main power means for supplying power to the microcomputer means;
   backup power means for supplying power to the microcomputer means and the display means when the main power means is removed from the instrument;
   detecting means for outputting a first signal indicating presence and absence of the main power means;
   signal to the microcomputer in response to the first signal received from the detecting means, wherein the signal outputting means is adapted to output the second signal to the microcomputer means whereupon the microcomputer means entirely turns off the display means when the detecting means outputs the first signal indicating that the main power means is absent from the instrument.

2. An electronic instrument, as defined in claim 1, further comprising;
   means for detecting voltage of said main power means, wherein said microcomputer means provides a warning display when the voltage of said main power means is detected to be less than a predetermined value.

3. An electronic instrument including operating units, comprising;
   microcomputer means for controlling operation of each unit of the instrument;
   main power means for supplying power to the microcomputer means;
   backup power means for supplying power to the microcomputer means in place of the main power means;
   detecting means for outputting a signal in response to loading of the main power means;
   backup voltage detecting means for detecting a voltage of the backup power means in accordance with the signal of the detecting means; and
   reset means for outputting a reset signal to initialize the microcomputer means, wherein the reset means is adapted to output the reset signal when the voltage detected by the backup voltage detecting means is below a predetermined value.

4. An electronic instrument including operating units, comprising:
   microcomputer means for controlling operation of each unit of the instrument;
   main power means for supplying power to the microcomputer means;
   backup power means for supplying power to the microcomputer means in place of the main power means;
   detecting means for outputting a signal in response to unloading of the main power means;
   a backup voltage detecting means for detecting a voltage of the backup power means in accordance with the signal of the detecting means; and
   reset means for outputting a reset signal to initialize the microcomputer means, wherein the reset means is adapted to output the reset signal when the voltage detected by the backup voltage detecting means is below a predetermined value.

5. An electronic instrument comprising:
   an operating unit;
   main power means and backup power means for supplying power to the operating unit;
   detecting means for outputting a signal indicating presence and absence of the backup power means;
   restriction means for outputting a limiting signal to the operating unit for limiting the operation thereof in response to the signal received from the detecting means, wherein the restriction means is adapted to output the limiting signal when the detecting means outputs a signal representing that the backup power means is absent from the instrument even if the voltage of the main power means is sufficient.

6. An electronic instrument comprising:
   an operating unit;
   main power means and backup power means for supplying power to the operating unit;
   detecting means for detecting irrespective of timing of loading of the main power means whether or not a voltage of the backup power means is sufficient; and
   restriction means for outputting a limiting signal to the operating unit for limiting the operation thereof in response to the detection of the detecting means, wherein the restriction means is adapted to output the limiting signal when the detecting means outputs a signal representing that the voltage of the backup power means is insufficient even if the voltage of the main power means is sufficient.

7. An electronic instrument including operating units, comprising:
   microcomputer means for controlling operation of each unit of the instrument;
   main power means for supplying power to the microcomputer means;
   backup power means for supplying power to the microcomputer means in place of the main power means;
   detecting means for outputting a signal in response to loading of the main power means;
   voltage detecting means for detecting a voltage supplied to the microcomputer from the backup power means in accordance with the signal of the detecting means; and
   reset means for outputting a reset signal to initialize the microcomputer means, wherein the reset means is adapted to output the reset signal when the voltage detected by the voltage detecting means is below a predetermined value.

8. An electronic instrument including operating units, comprising:
   microcomputer means for controlling operation of each unit of the instrument;
   main power means for supplying power to the microcomputer means;
   backup power means for supplying power to the microcomputer means in place of the main power means;
   detecting means for outputting a signal in response to unloading of the main power means;
   voltage detecting means for detecting a voltage supplied to the microcomputer from the backup power means in accordance with the signal of the detecting means; and
   reset means for outputting a reset signal to initialize the microcomputer means, wherein the reset means is adapted to output the reset signal when the voltage detected by the voltage detecting means is below a predetermined value.

* * * * *